United States Patent
Baarman

(10) Patent No.: US 8,164,222 B2
(45) Date of Patent: Apr. 24, 2012

(54) LAPTOP AND PORTABLE ELECTRONIC DEVICE WIRELESS POWER SUPPLY SYSTEMS

(75) Inventor: David W. Baarman, Fennville, MI (US)

(73) Assignee: Access Business Group International LLC, Ada, MI (US)

( * ) Notice: Subject to any disclaimer, the term of this patent is extended or adjusted under 35 U.S.C. 154(b) by 786 days.

(21) Appl. No.: 12/252,778

(22) Filed: Oct. 16, 2008

(65) Prior Publication Data

US 2009/0106567 A1 Apr. 23, 2009

Related U.S. Application Data

(60) Provisional application No. 60/999,263, filed on Oct. 17, 2007.

(51) Int. Cl.
*G06F 1/00* (2006.01)

(52) U.S. Cl. .......................................... 307/104; 190/100

(58) Field of Classification Search .................. 307/104; 361/679.41; 206/320; 455/557; 312/223.3; 190/100, 102

See application file for complete search history.

(56) References Cited

U.S. PATENT DOCUMENTS

| | | | |
|---|---|---|---|
| 5,666,265 A | 9/1997 | Lutz | |
| 6,731,071 B2 | 5/2004 | Baarman | |
| 6,803,744 B1 * | 10/2004 | Sabo | 320/108 |
| 7,076,206 B2 | 7/2006 | Elferich et al. | |
| 7,198,512 B1 * | 4/2007 | Swiatek | 439/501 |
| 7,278,644 B2 * | 10/2007 | Villarreal | 280/47.26 |
| 7,352,567 B2 | 4/2008 | Hotelling et al. | |
| 7,378,817 B2 * | 5/2008 | Calhoon et al. | 320/108 |
| 7,394,165 B2 * | 7/2008 | Schiller | 290/1 R |
| 7,408,324 B2 | 8/2008 | Baarman et al. | |
| 7,679,902 B2 * | 3/2010 | Thompson | 361/679.44 |
| 7,863,859 B2 * | 1/2011 | Soar | 320/108 |
| 7,936,147 B2 | 5/2011 | Kook | |
| 2003/0023471 A1 | 1/2003 | Kettler, III et al. | |

(Continued)

OTHER PUBLICATIONS

International Search Report, International Application No. PCT/US2008/079974, Jun. 30, 2009.
Written Opinion of the International Searching Authority, International Application No. PCT/US2008/079974, International Filing Date Oct. 15, 2008.

*Primary Examiner* — Fritz M Fleming
(74) *Attorney, Agent, or Firm* — Warner Norcross & Judd LLP

(57) ABSTRACT

The present invention provides wireless power supply systems intended primarily for use in powering and charging laptops and other portable electronic devices. In one embodiment, the power supply system includes a laptop cradle that can be used in upright or reclined positions. The cradle may be generally J-shaped and may house the wireless power supply circuit with the channel defined in the cradle. The cradle may includes a plurality of primaries to provide the ability to supply power to more than one device and/or to permit flexibility in placement of devices on or in the cradle. The present invention may also provide handheld cradles sized to power handheld devices that can be separate, standalone power supply stations or they can receive power from the laptop cradle. In an alternative embodiment, the power supply station may be incorporated into an adjustable height desktop pedestal. In yet another embodiment, the power supply station may be incorporated into a flexible desktop mat. The power supply station may be incorporated into a power block having one or more magnets that draw the power block into alignment. In another alternative embodiment, the power supply station is incorporated directly into items of luggage.

19 Claims, 29 Drawing Sheets

U.S. PATENT DOCUMENTS

| | | |
|---|---|---|
| 2004/0060687 A1 | 4/2004 | Moss |
| 2004/0150934 A1 | 8/2004 | Baarman |
| 2005/0007067 A1 | 1/2005 | Baarman |
| 2005/0127869 A1 | 6/2005 | Calhoon |
| 2005/0162824 A1 | 7/2005 | Thompson |
| 2006/0043927 A1 | 3/2006 | Beart |
| 2006/0061323 A1 | 3/2006 | Cheng et al. |
| 2006/0205381 A1 | 9/2006 | Beart et al. |
| 2007/0035917 A1 | 2/2007 | Hotelling |
| 2007/0182367 A1 | 8/2007 | Partovi |

* cited by examiner

LAPTOP AND PORTABLE ELECTRONIC DEVICE WIRELESS POWER SUPPLY SYSTEMS

BACKGROUND OF THE INVENTION

The present invention relates to wireless power supply systems, and more particularly to inductive power supply systems for laptops and other portable electronic devices.

There continues to be dramatic growth in the use of laptops and other portable electronic devices, such as personal digital assistants, cellular phones, smart phone and portable media players. Although a variety of standards have been developed for providing wireless communication with electronic devices, these devices continue to be plagued with a need for corded power supplies. Typically, each electronic device requires a separate power supply cord. These cords are a burden to use, store and carrying around as needed. Cords create an unsightly mess and are perhaps the single most evident hurdle to complete device mobility. A conventional hard wired laptop solution is illustrated in FIG. 1. Various input and output devices, such as mice, keyboards, printers and monitors, as well as network and power supplies are connected to the laptop using conventional cords. The various cords required to provide data communication and power not only result in clutter, but are an impediment to device mobility.

SUMMARY OF THE INVENTION

The present invention provides a variety of wireless power supply systems intended primarily for use in powering and charging laptops and other portable electronic devices. In one embodiment, the power supply system includes a laptop cradle that can be used in upright or reclined positions. The cradle may be generally J-shaped and may house the wireless power supply circuit with the channel defined in the cradle.

In one embodiment, the cradle includes legs that can be opened to support the cradle in the upright position and closed so that they are out of the way when the cradle is in the reclined position.

In one embodiment, the cradle includes a plurality of primaries, such as primary coils, arranged to provide the ability to supply power to more than one device and/or to permit flexibility in placement of devices on or in the cradle.

In one embodiment, the cradle can be placed within a laptop bag to permit devices to be charged while they are stored in the bag. The bag may be provided with a retractable cord.

In one embodiment, the present invention also includes handheld cradles sized to power handheld devices. The handheld cradles can be separate, standalone power supply stations or they can receive power from the laptop cradle.

In an alternative embodiment, the power supply station may be incorporated into an adjustable height desktop pedestal.

In another alternative embodiment, the power supply station may be incorporated into a desktop panel. The panel may be configured to power a laptop, as well as additional handheld devices. If desired, the panel can include different power regions for different devices.

In yet another embodiment, the power supply station may be incorporated into a flexible desktop mat. In this embodiment, the power supply circuitry may be located in a rigid housing and the mat may be capable of being wrapped around the rigid housing for storage.

In a further embodiment, the power supply station may be incorporated into a power block. The power block may be positioned adjacent to a secondary located on the laptop. The power block and laptop may include magnets that draw the power block into alignment on the laptop.

In another alternative embodiment, the power supply station is incorporated directly into items of luggage. In this embodiment, the power supply circuitry can be contained in the luggage and one or more primaries, such as primary coils, can be located within the luggage to charge stored devices. In one embodiment, a primary coil is situated around a plurality of pockets to provide power to devices placed in those pockets.

The present invention provides a variety of useful and convenient power supply stations that are capable of powering and/or charging portable electronic devices. These and other objects, advantages, and features of the invention will be readily understood and appreciated by reference to the detailed description of the current embodiment and the drawings.

DESCRIPTION OF VARIOUS EMBODIMENTS

Figure 1:
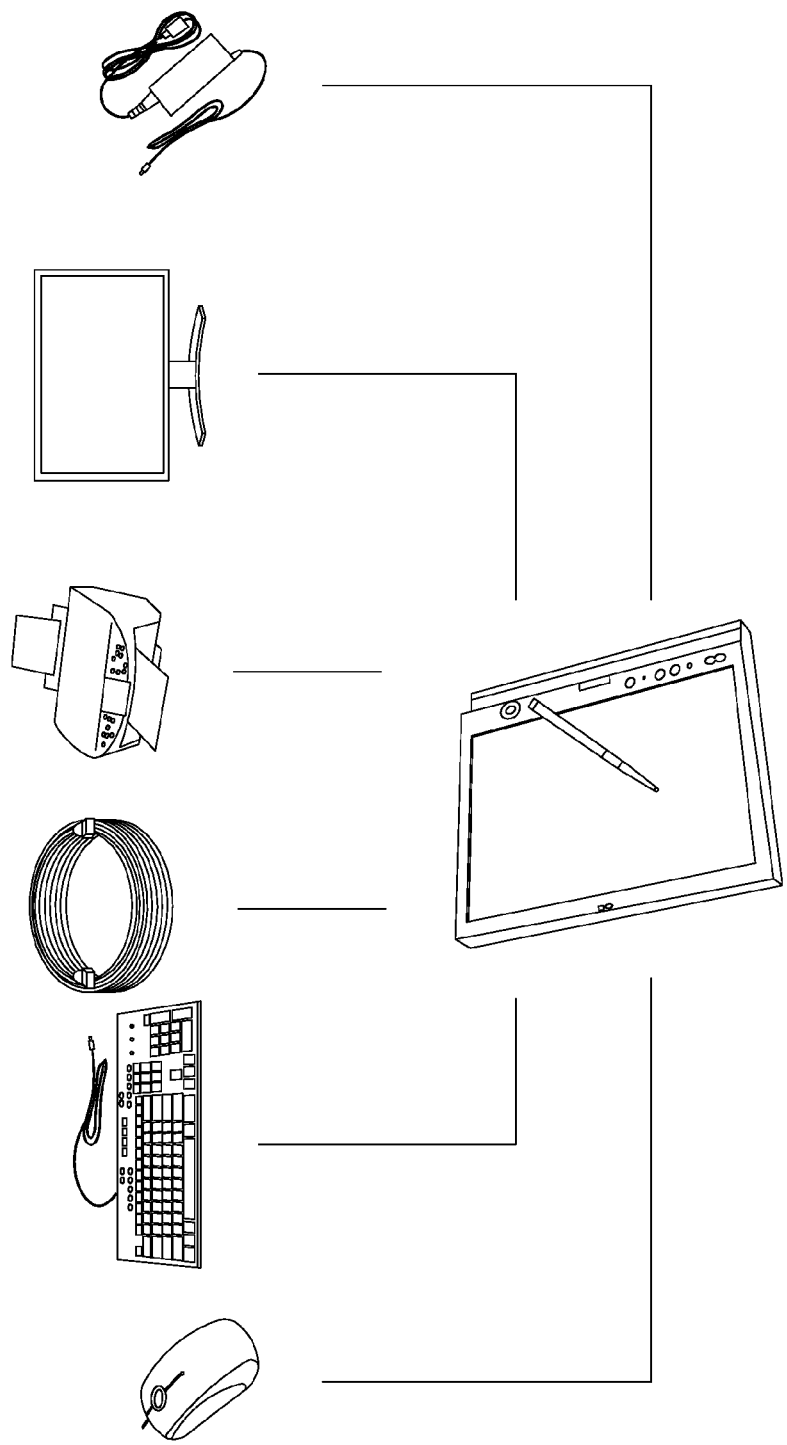
FIG. 1 is an illustration of a conventional hard wired laptop solution.
Figure 2:
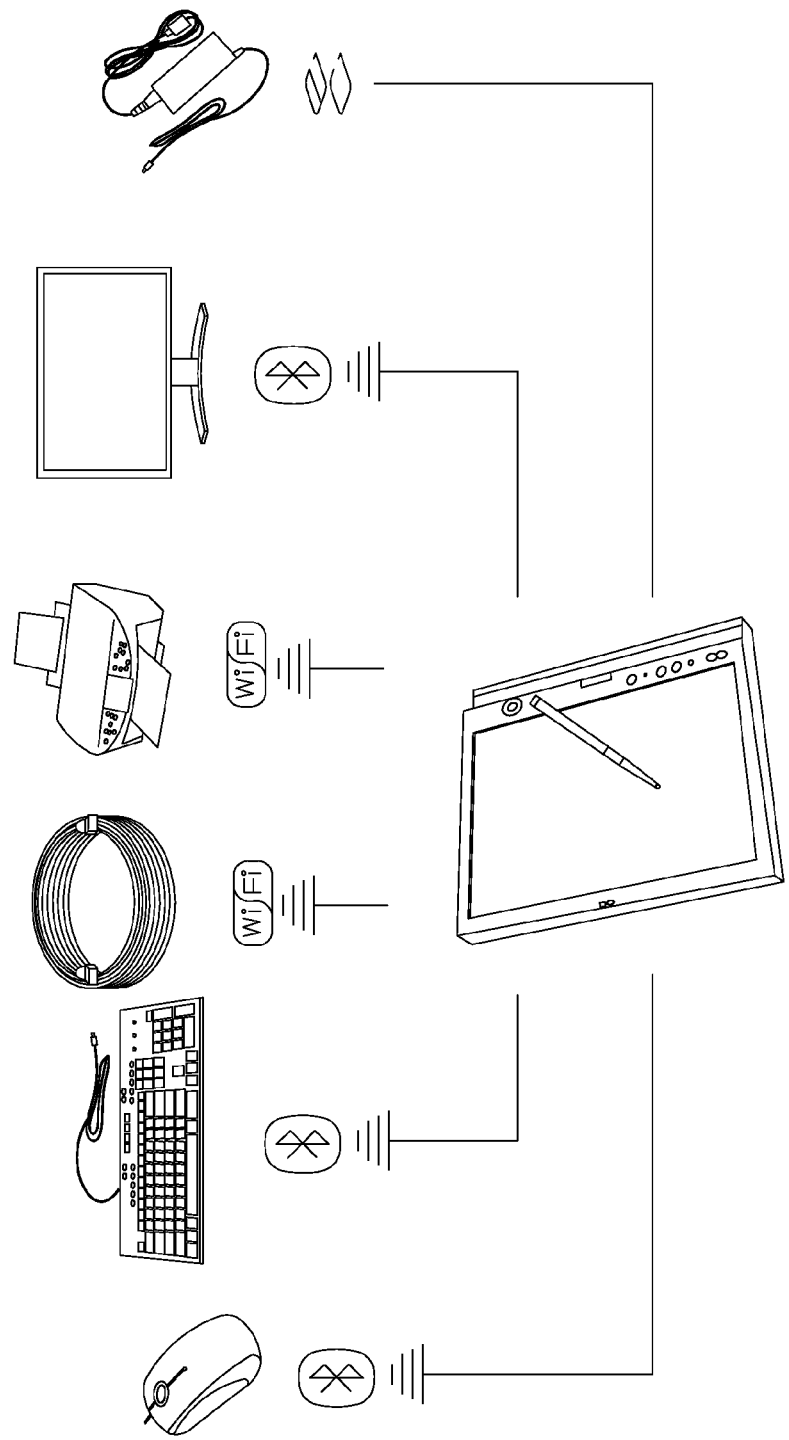
FIG. 2 is an illustration of a wireless laptop solution incorporating wireless power supply.
Figure 3:
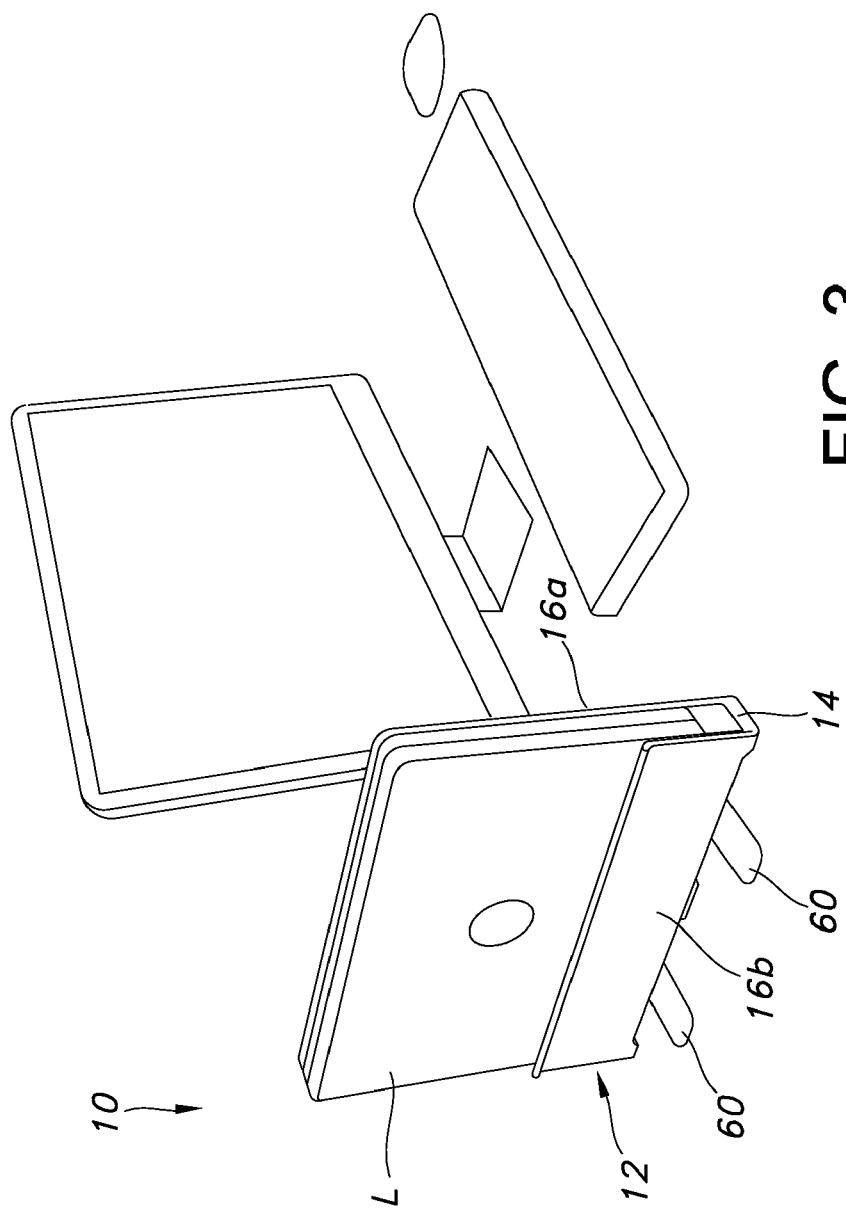
FIG. 3 is an illustration of the power supply station showing the cradle in the upright position.
Figure 4:
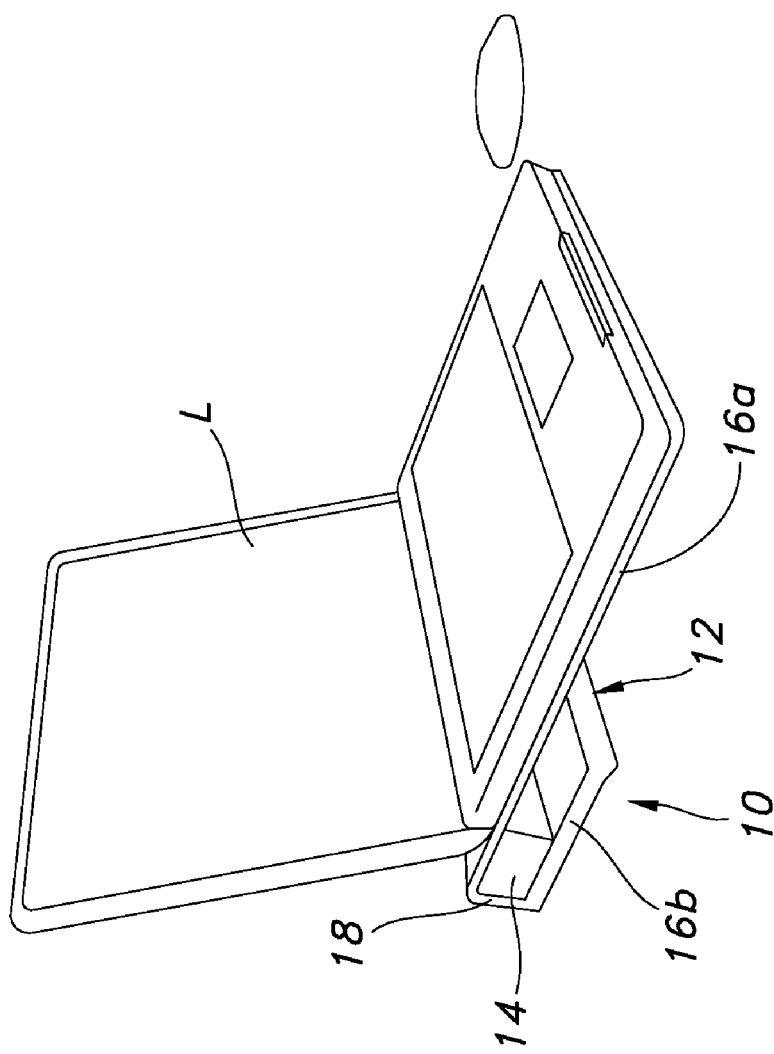
FIG. 4 is an illustration of the power supply station showing the cradle in the reclined position.
Figure 5:
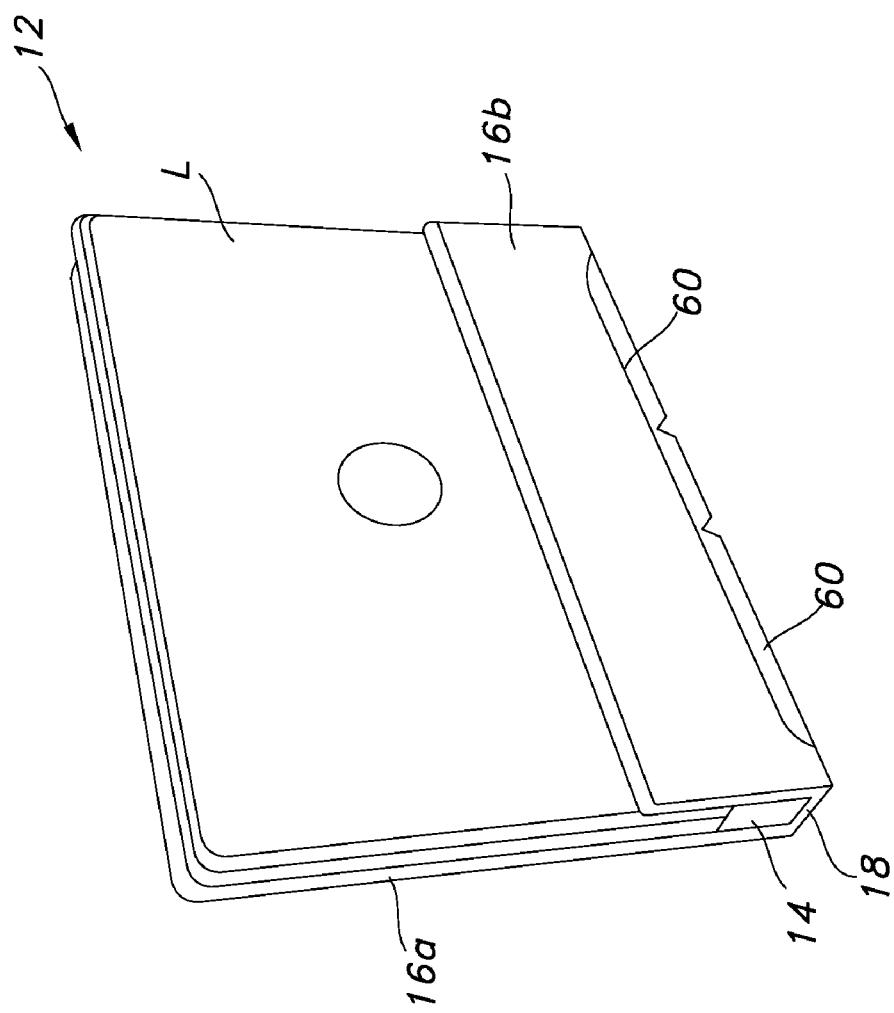
FIG. 5 is an illustration of the laptop in the cradle.
Figure 6:
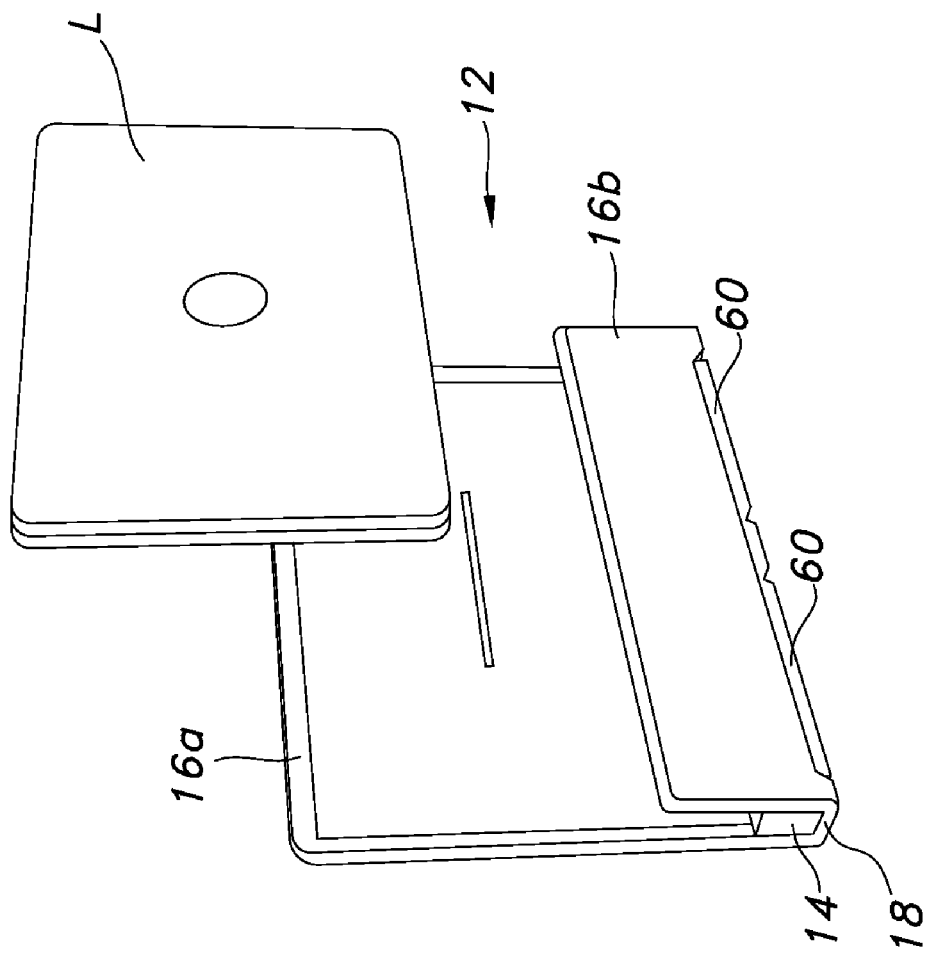
FIG. 6 is an exploded illustration of the power supply station and laptop.

The present invention relates to the wireless supply of power to electronic devices using inductive coupling. The power supplied through the present invention may be used to power the electronic device and/or to charge the device's internal batteries. FIG. 2 is an illustration showing a laptop solution in which the various data communication and power supply are achieved wirelessly. In the illustration, the mouse, keyboard and monitor are wirelessly connected to the laptop using Bluetooth™ technology, and the network and printer are connected using WiFi technology. Neither of these wireless data technologies provides a solution for wirelessly powering the laptop. As shown, eCoupled™ technology can be used to supply power to the laptop using inductive coupling.

The various embodiments of the present invention may incorporate essentially any inductive power supply circuitry. However, in the illustrated embodiments, the present invention incorporates eCoupled™ inductive power supply technology available from Fulton Innovations of Ada, Mich. In one embodiment, the present invention includes an adaptive inductive power supply system capable of varying the amount of power supplied by the inductive coupling based on the needs of the device or devices being powered. The adaptive inductive power supply system may have the ability to supply power to the electronic device at the correct magnitude at the beginning of operation, as well as to continually monitor the power supply circuit and make adjustments in real-time as desirable. This technology allows the power supply circuit to adapt to changes in the power requirements of the remote device. For example, the power supply circuit may have the ability to adjust characteristics, such as frequency, duty cycle and power magnitude, to accommodate different devices, including combinations of different devices, and to adjust for misalignment between the primary coil and the secondary coil. U.S. Pat. No. 6,436,299 to Baarman et al; U.S. Pat. No. 6,825,620 to Kuennen et al; U.S. Pat. No. 7,212,414 to Baarman; U.S. Publication No. 2004/0150934 to Baarman and U.S. Publication No. 2004/0130915 to Baarman are incorporated herein by reference. The present invention may include a power supply system that has the ability to identify the remote device and authenticate its ability to receive power from the power supply system. U.S. Publication No. 2007/0042729 to Baarman et al; U.S. Provisional Application No. 60/883,127 to Baarman; and U.S. Provisional Application No. 60/883,125 to Baarman are incorporated herein by reference. This technology may allow the power supply system to tune itself to operate at peak efficiency with a wide range of devices—even devices with dramatically different power requirements. Although not required, the aforementioned eCoupled™ technologies provide design flexibility and allow the system to provide power to multiple devices. The present invention may also include a multi-phase inductive power supply, such as a three-phase inductive power supply. A multi-phase inductive power supply system may improve efficiency, reduce cost and reduce heat generated by the power supply system. U.S. Provisional Application No. 60/976,137 entitled "Multiphase Inductive Power Supply System," filed on Sep. 28, 2007, by Baarman is incorporated herein by reference.

An inductive power supply station 10 with integrated power supply circuitry and inductive primary coils is shown in FIGS. 3-14. The illustrated power supply station in intended for use in both upright and horizontal orientations. In the upright position, power supply station 10 supports the laptop L, for example, while the laptop batteries (not shown) are being charged (See FIG. 3). In the upright position, the power supply station 10 may act something like a CPU stand enabling a cleaner desktop and maintaining easy access to the laptop's ports and CD/DVD player. In the horizontal orientation, the power supply station 10 provides a pedestal that permits the laptop L to receive power inductively while the laptop L is in use (See FIG. 4). The power supply station 10 may, as shown, approximate the size of a standard laptop to provide easier portability, additional laptop protection, easy opportunity charging and improved ergonomics away from the home base. In the reclined (or inclined) position, the power supply station 10 improves screen height and raises the typing surface. The primary coils are arranged to provide power transfer from inside (upright position) or outside (inclined position) the power supply station 10.

The power supply station 10 generally includes a cradle 12 and a power supply 14 (See FIGS. 5-8). In the illustrated embodiment, the power supply 14 is housed in a housing 20 located within the cradle 12. The housing 20 may be a generally rectangular box of sufficient size to contain the power supply circuitry (not shown). The power supply 14 may include a conventional AC power plug (not shown) and cord 17 (See FIG. 7) for receiving power from a conventional AC power outlet. The power supply 14 includes circuitry for transforming the input power so that it is suitable for application to one or more inductive primaries, such as primary coils. As described in more detail above, the power supply circuitry in the power supply station and the powered devices may be essentially any inductive power supply circuitry, but, in the illustrated embodiments, is eCoupled™ inductive power supply circuitry available from Fulton Innovations of Ada, Mich.

The cradle 12 is generally J-shaped having a pair of spaced apart walls 16a-b interconnected by bridge 18. The walls 16a-b may be spaced apart an appropriate distance to closely receive the intended laptop L or remote devices D. As shown, wall 16a may be configured to extend substantially coextensively with the laptop L. However, the size shape and configuration of wall 16a may vary from application to application. Wall 16a may include a positive form for locating the laptop L within the cradle 12. Wall 16a may include one or more inductive primaries capable of generating an inductive field that can be intercepted by one or more secondaries incorporated into the laptop or other remote device D. The primaries may be primary coils that are embedded within or mounted upon a surface of the wall 16a. The number, size, shape and configuration of primaries will vary from application to application. Typically, the primaries will be arranged to align with secondaries located in the laptop or other electronic devices intended for use with the cradle 12. In the illustrated embodiment, wall 16b functions both as a catch for holding the laptop L in the upright position and as a rest for supporting the cradle 12 when in the reclined position. The size, shape and configuration of wall 16b may vary from application to application as desired. Although not included in wall 16b of cradle 12, one or more primaries may be incorporated into wall 16b, if desired.

Figure 7:
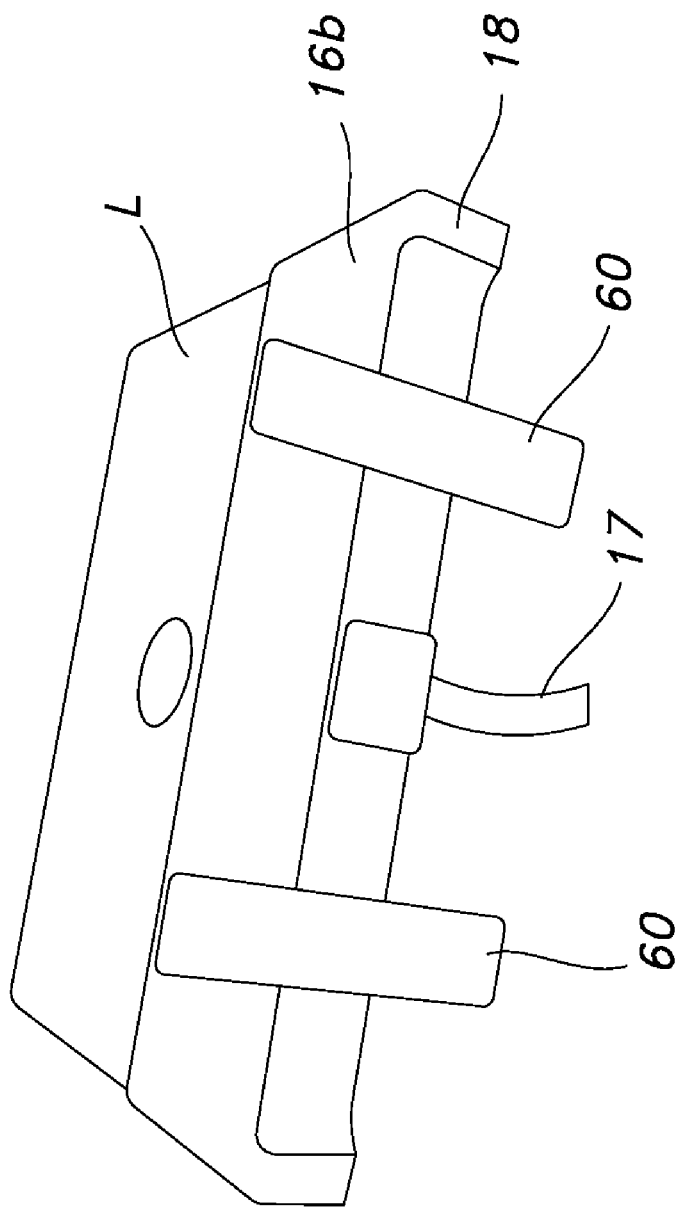
FIG. 7 is a bottom perspective illustration of the power supply station and laptop.

As shown in FIG. 7, the cradle 12 may also include swiveling feet 60 that can be swiveled out to support the cradle 12 in the upright position or swiveled in so that they are out of the way when the cradle 16 is in the reclined position.

Figure 8:
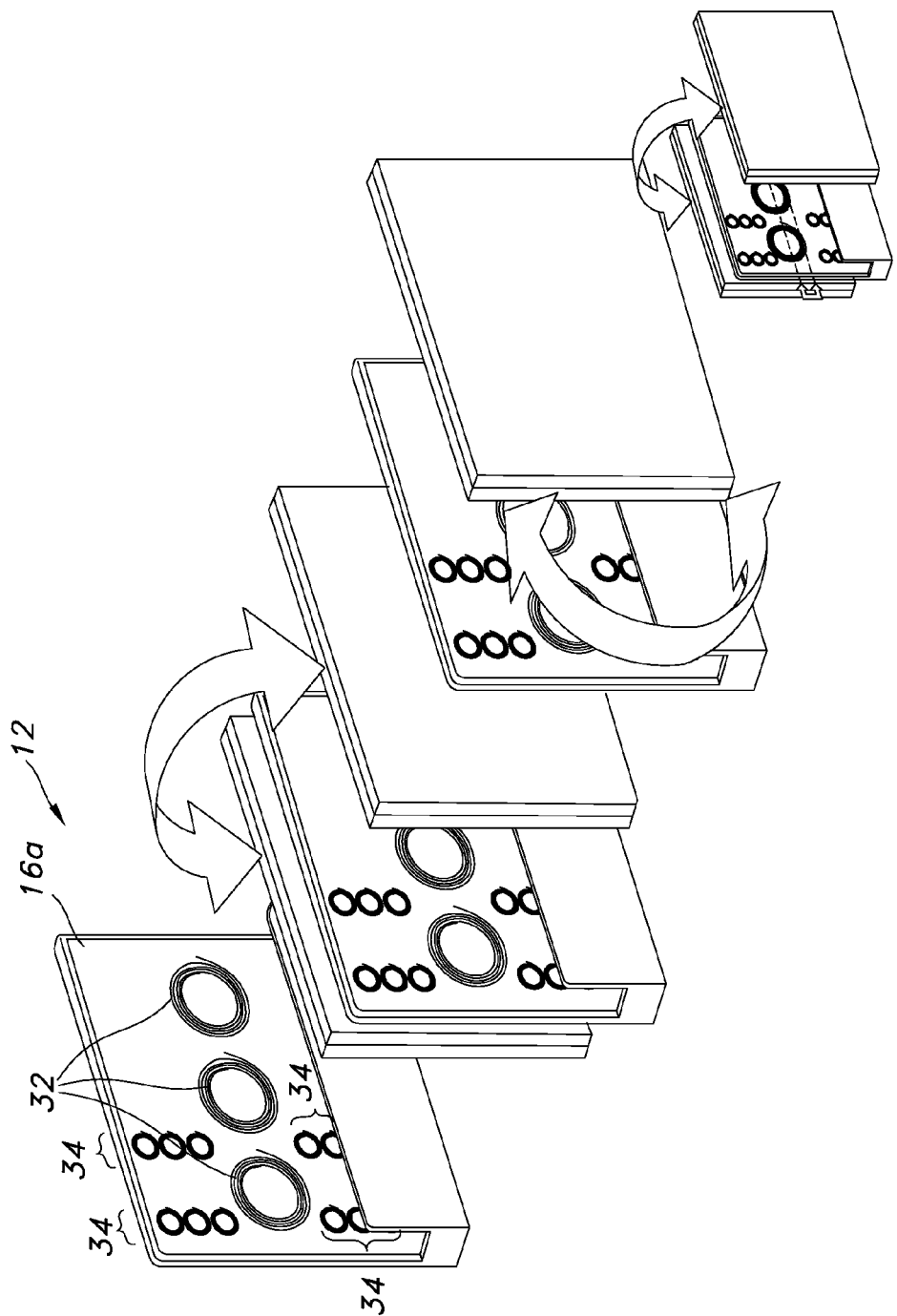
FIG. 8 is various illustrations of a cradle and laptop with a three-phase coil arrangement.
Figure 9:
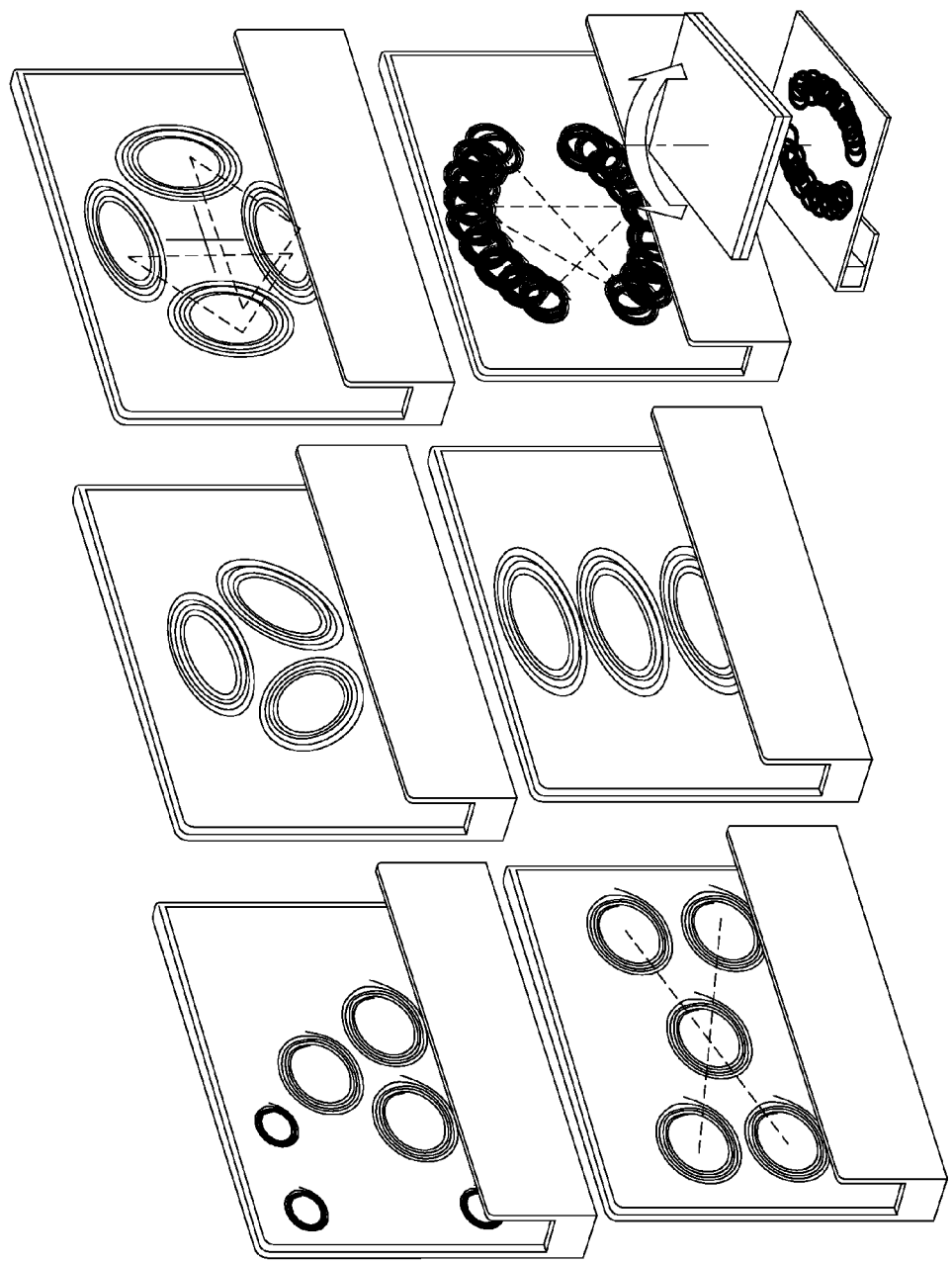
FIG. 9 is an illustration showing various cradles with alternative three-phase coil arrangements.
Figure 10:
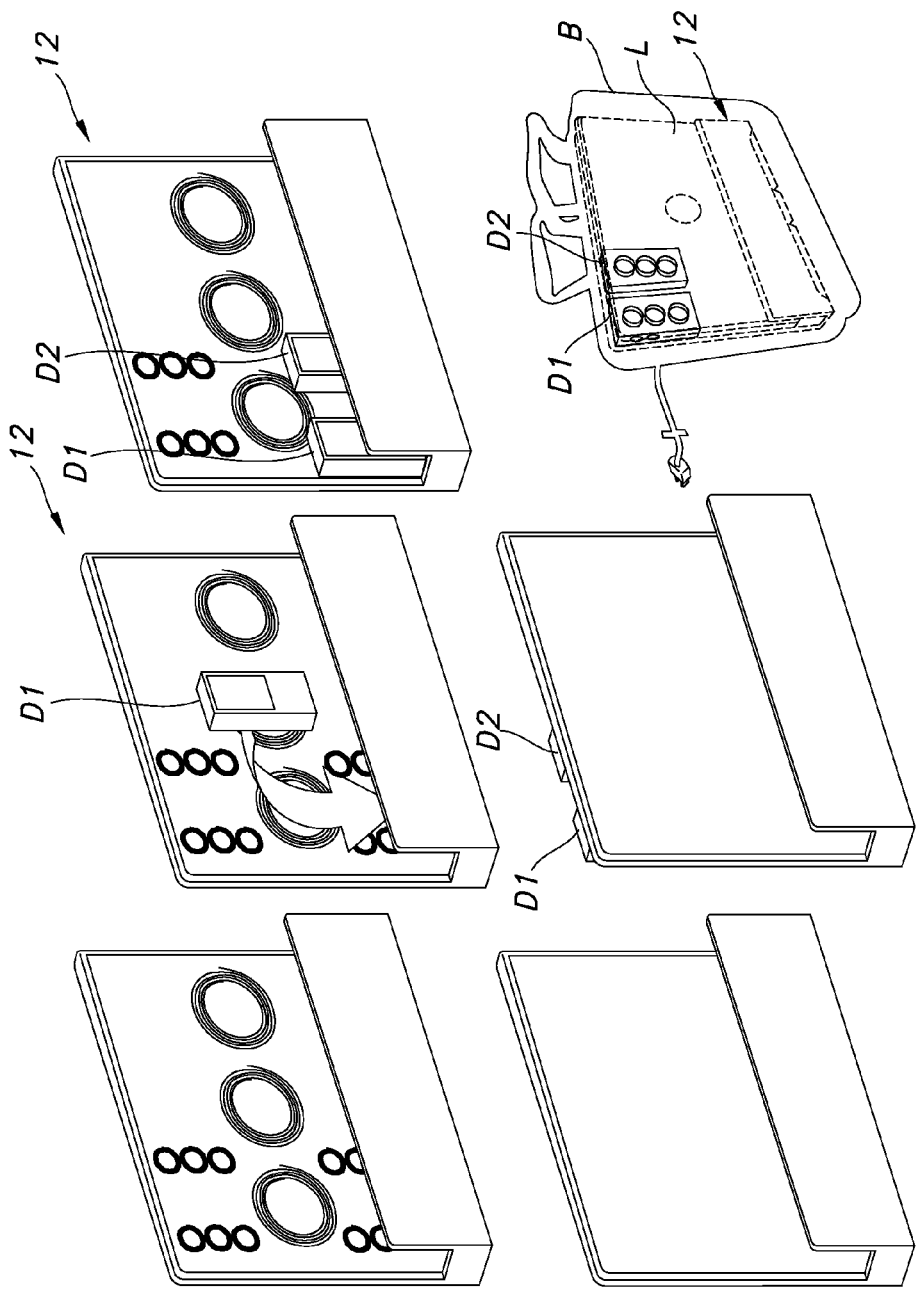
FIG. 10 is various illustrations of the three-phase cradle showing handheld devices and laptops, and further showing the cradle incorporated into a laptop bag.

As noted above, the power supply station 10 may incorporate three-phase inductive power technology. FIGS. 8-10 show a variety of optional primary coil arrangements suitable for use with a three-phase inductive power supply system. As shown, the wall 16a may include three large, roughly centrally located coils 32 to provide three-phase inductive power to the laptop L, as well as a plurality of smaller three-coil sets 34 to provide three-phase power to a plurality of other electronic devices D (such as hand held electronic devices). In one embodiment, the coils 32 and 34 generate an inductive field that will power an electronic device located on either side of wall 16a. In this embodiment, the wall 16a is manufactured from materials that provide minimal interference with the inductive field generated by the coils 32 and 34. If it is desirable to permit the laptop L to receive power in either up or down orientations, the primary coils 32 may be arranged in a row along the centerline of wall 16a. If it is desirable to permit the laptop L to receive power in only a single orientation, the coils 32 can be shifted above or below the centerline. Several embodiments in FIG. 9 include different broken lines to show possible three-phase coil combinations that may be used depending on orientation of the device to be powered. FIG. 10 illustrates, among other things, the placement of portable electronic devices D1 and D2 in a cradle 12 having a specific coil arrangement. The position of the coils may vary and, accordingly, the position of the devices D1 and D2 may also vary.

Figure 11:
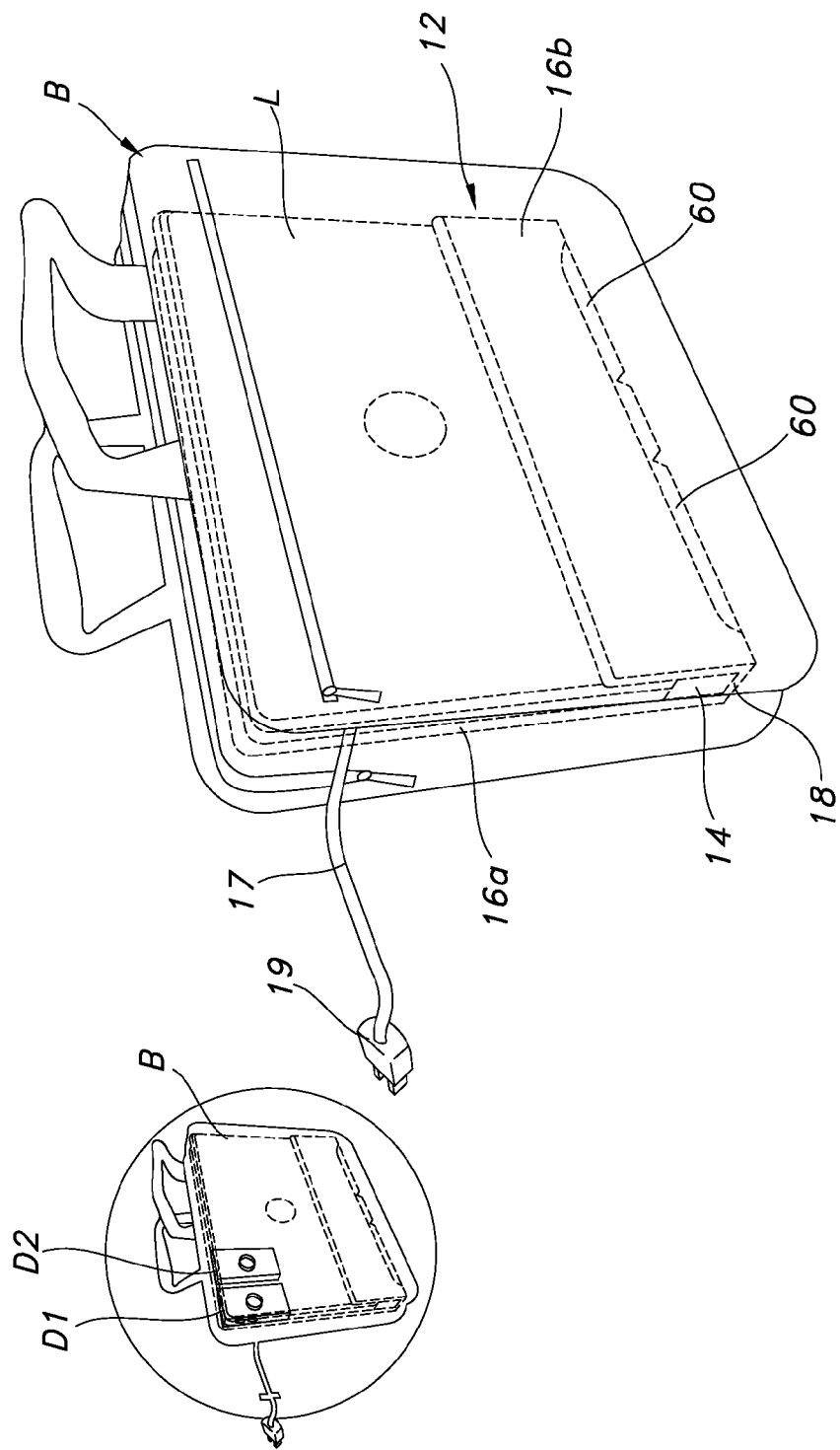
FIG. 11 is an illustration showing the cradle incorporated into a laptop bag.
Figure 12:
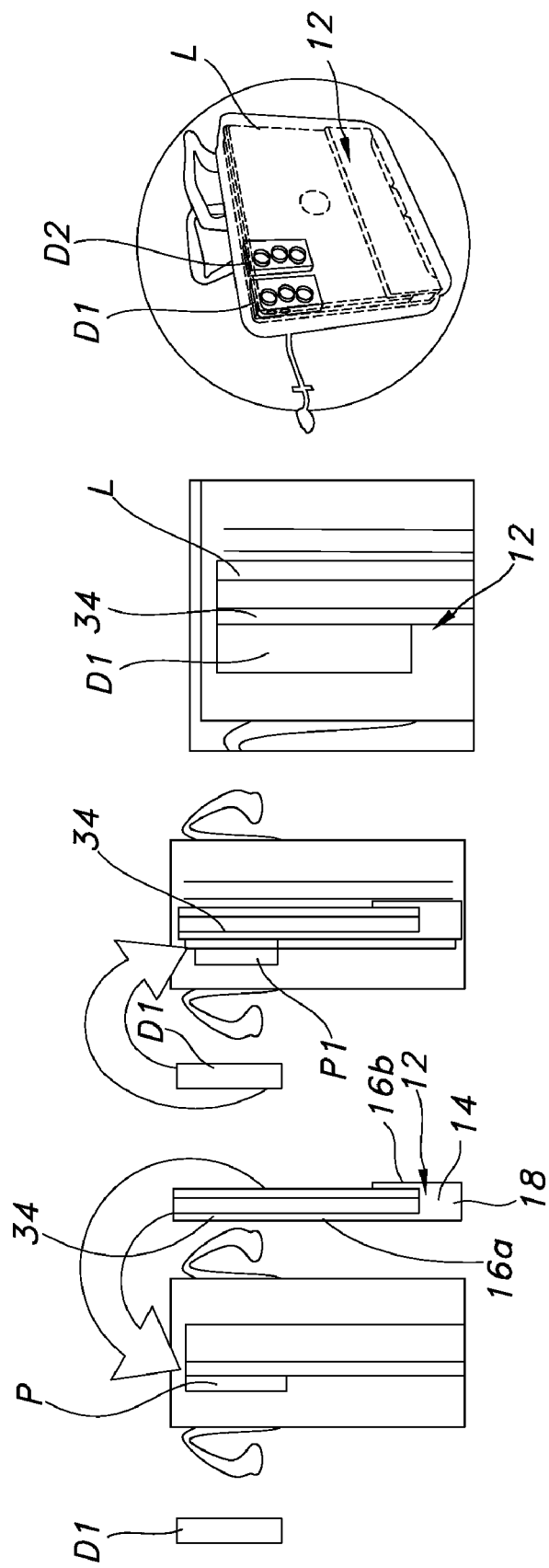
FIG. 12 is an illustration showing the interior of a laptop bag.

Referring now to FIGS. 11-12, the power supply station 10 may be located within a laptop bag B. The power supply station 10 may be permanently or removably fitted into the laptop bag B. As shown, the laptop L may be fitted into the cradle 12 and a pair of devices D1 and D2 may be placed in pockets P within the bag B that are adjacent to coils sets 34. This configuration permits the laptop L and at least two remote devices D1 and D2 to be powered while contained within the bag B. This aspect of the present invention permits a user to charge the laptop L and handheld devices D1 and D2 while they remain stored in the bag B. This can enable "opportunity charging"—the ability of a user to plug in the power supply station 10 whenever the opportunity arises with the hassle of traditional chargers. Additional illustrations of the cradle 12 located within a laptop bag B are shown in FIG. 12. One or more centering/locating magnets may be incorporated into the device D1 and the wall 16a to draw the device D1 into proper alignment with the coil set 34.

Figure 13:
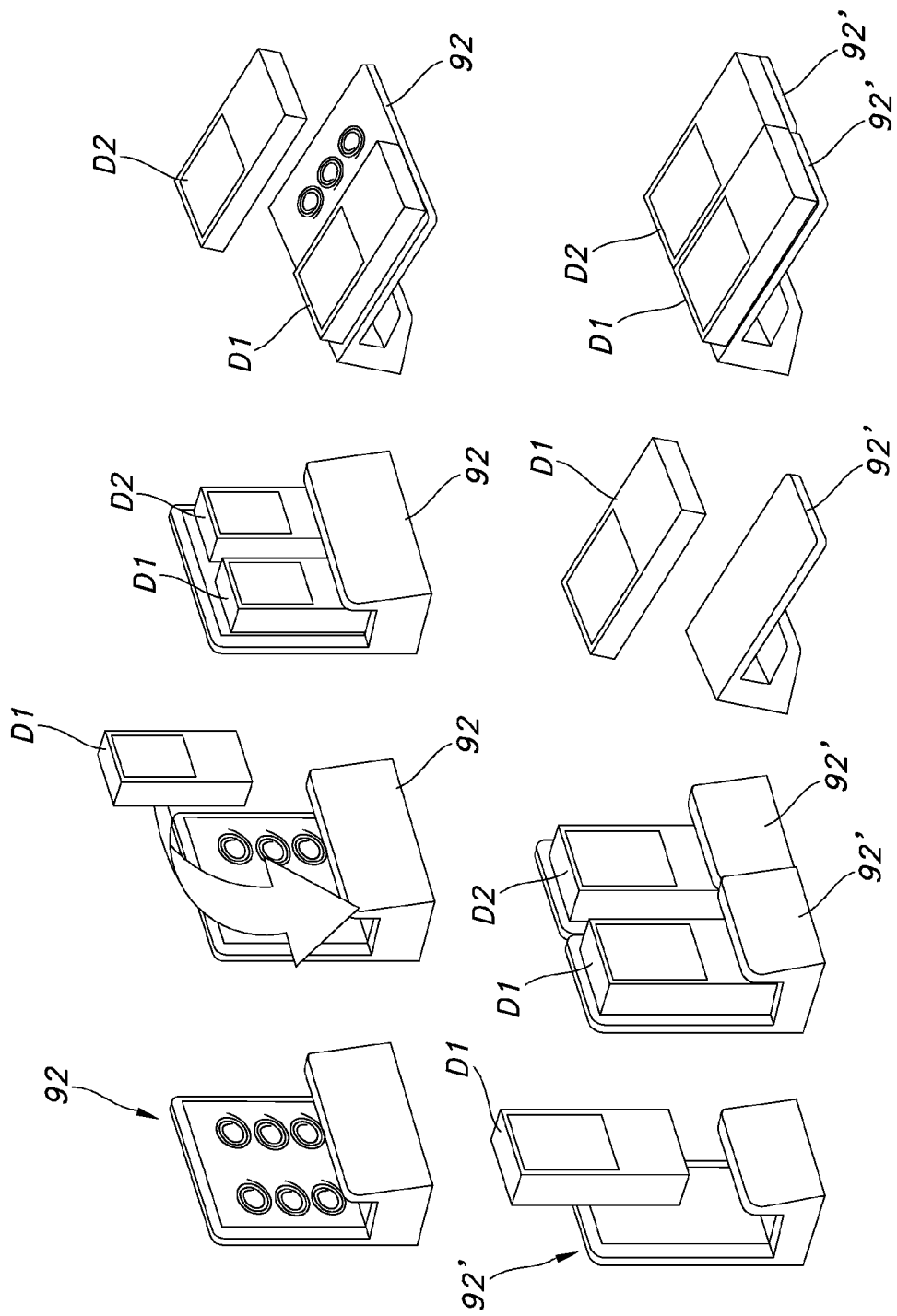
FIG. 13 is various illustrations of different handheld cradles in different orientations and arrangements.
Figure 14:
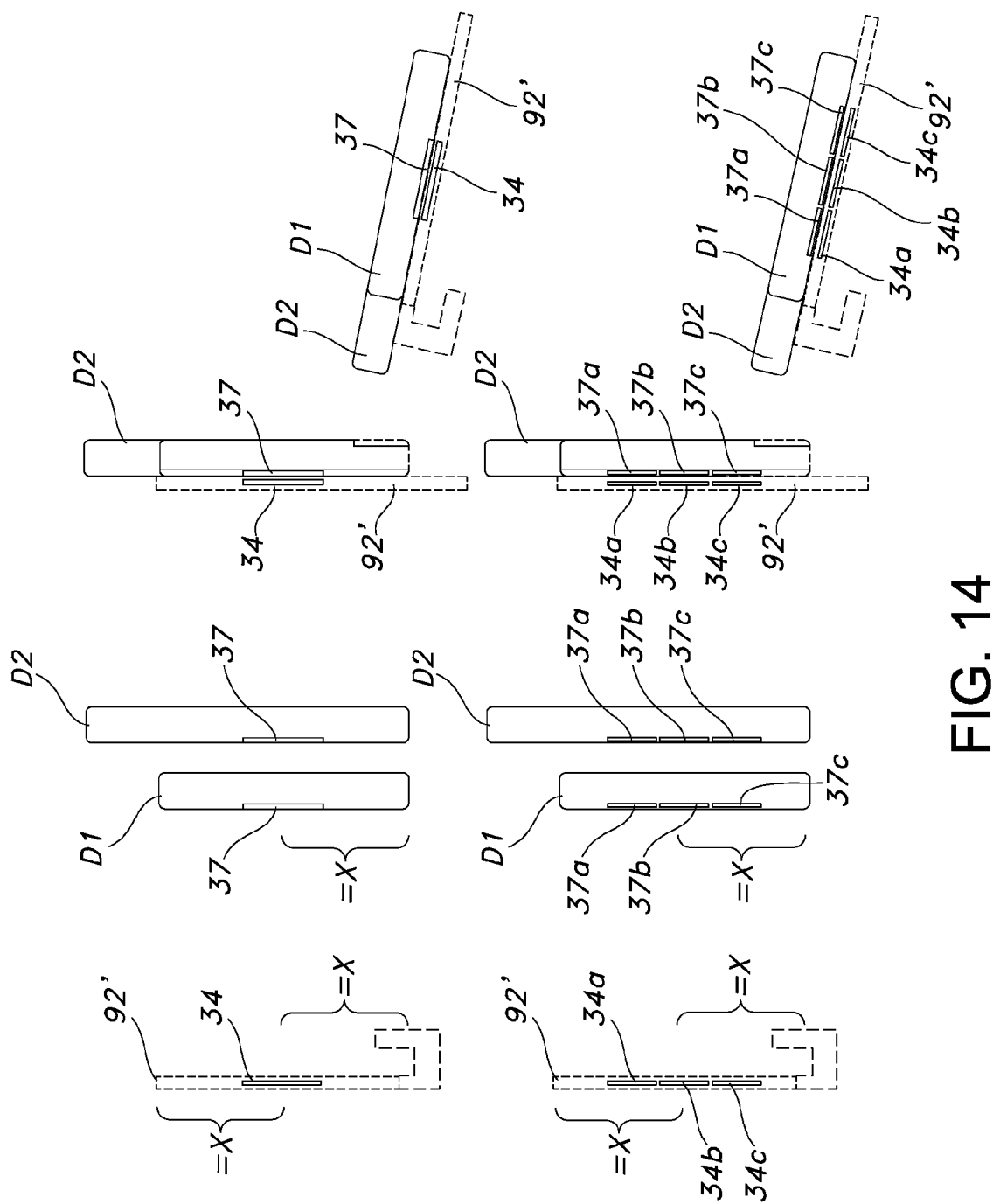
FIG. 14 is various illustrations showing potential coil arrangements in the handheld cradle and handheld device.

The power supply station 10 may include separate device charging cradles. A variety of alternative remote charging cradles 92 and 92' are shown in FIG. 13. The cradle may be sized to receive a pair of handheld devices, such as cradle 92, or sized to receive only a single device, such as cradle 92'. The size, shape and configuration of the device charging cradles may vary from application to application. As shown, the handheld cradle 92 may be used in upright or reclined positions. FIG. 14 shows one possible coil placement for a single-phase inductive solution and one possible coil arrangement for a three-phase inductive solution. As shown, devices of different sizes can be used with the cradle 92' by properly positioning the secondary 37 (or secondaries 37a-c) in the device D1 and D2 so that it substantially aligns with the primary 34 (or primaries 34a-c) in the cradle 92'.

Figure 15:
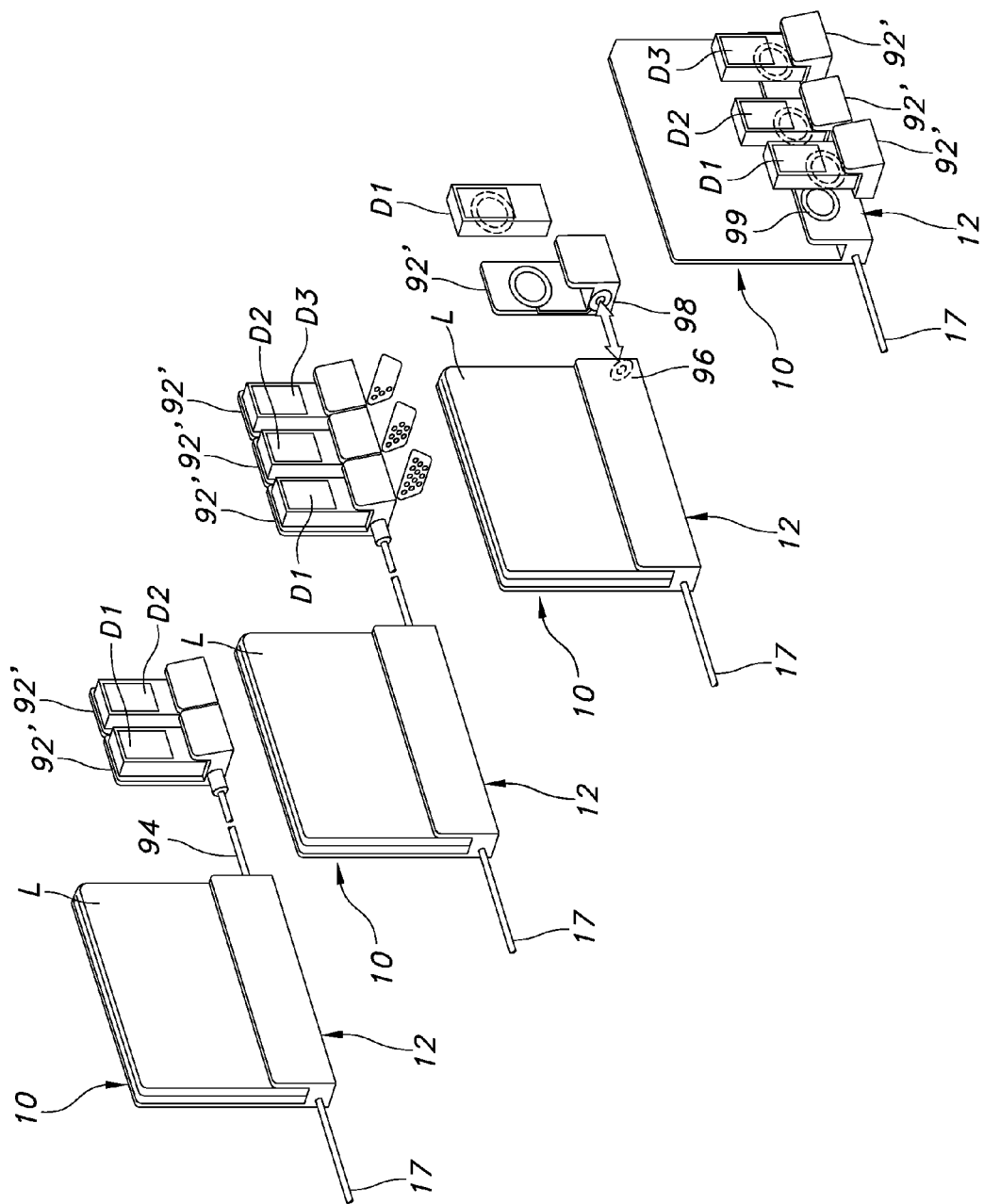
FIG. 15 is various illustrations of handheld cradles coupled to a laptop cradle.

The handheld cradle may be essentially a scaled-down, standalone version of power supply station 10 having its own power supply circuitry (not shown) and power cord (not shown). Alternatively, the handheld cradle may be configured to receive power from the laptop cradle 12. As shown in FIG. 15, handheld cradles 92' may receive power from the laptop cradle 12 in a variety of ways. For example, the laptop cradle 12 may supply 120V AC to one or more handheld cradles 92' via a cord 94. In this embodiment, the handheld cradles 92' include circuitry (not shown) for converting the input power for inductive transfer. As another example, the power supply circuitry of the laptop cradle 12 may convert the power and directly power primary coils (not shown) contained within the handheld cradles 92'. This alternative eliminates the need for separate power supply circuitry in the handheld cradles 92'. Power may alternatively be conveyed to the handheld cradles 92' wirelessly. For example, the laptop cradle 12 and handheld cradle 92 may include a pair of inductive coils 96 and 98 for transferring power from the laptop cradle 12 to the handheld cradle 92. Alternatively, the handheld cradles 92 may not include any internal circuitry and may instead function simply to locate the handheld devices within sufficient proximity to primary coils 99 in the laptop cradle 12.

Figure 16:
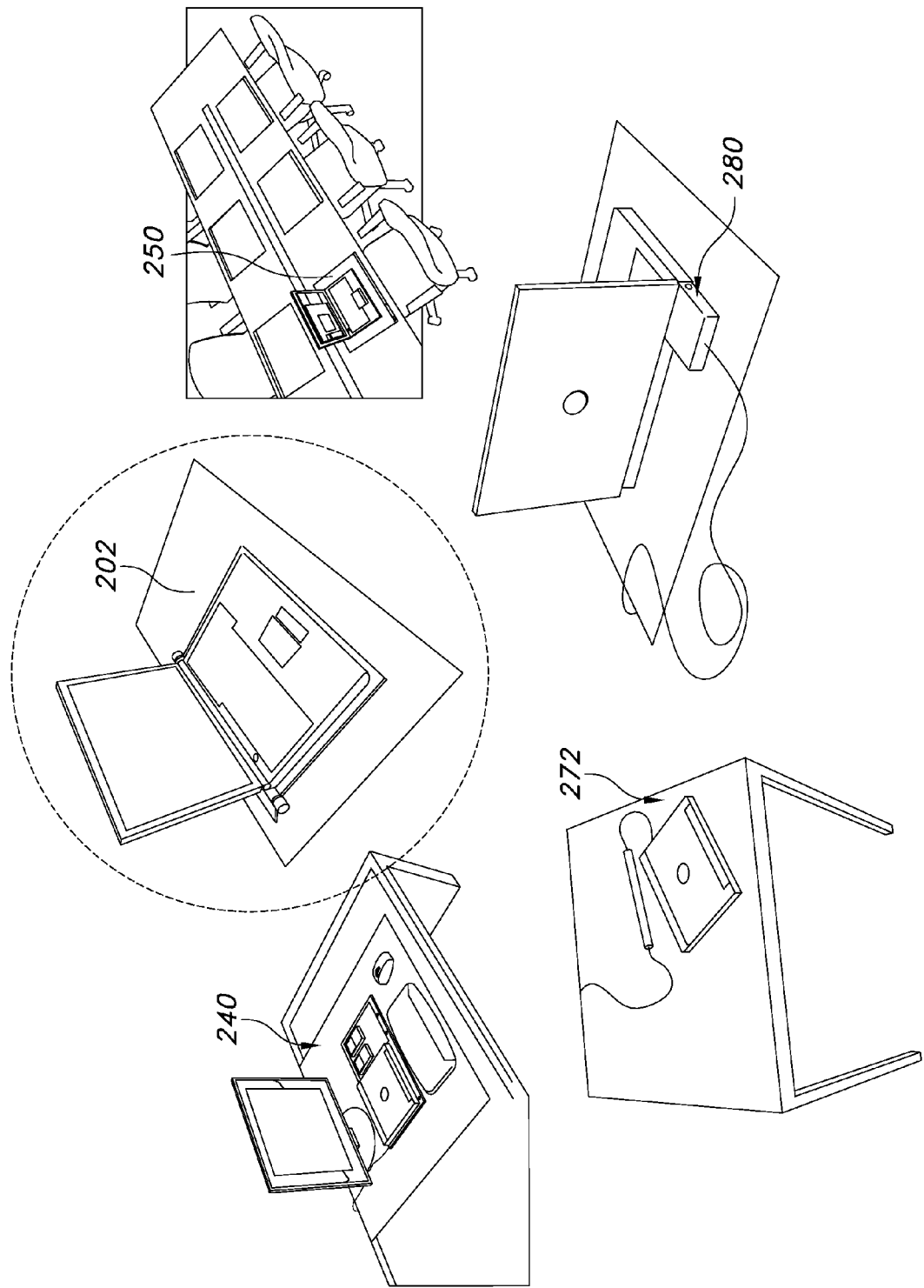
FIG. 16 is an illustration of various alternative power supply stations in accordance with the present invention.

FIG. 16 shows a variety of alternative power supply stations, each of which will be described in more detail below. Generally, FIG. 16 shows power supply stations incorporated into an adjustable height desktop pedestal 202, various desktop panels 240 and 250, a flexible mat 272 and a power brick 280.

Figure 17:
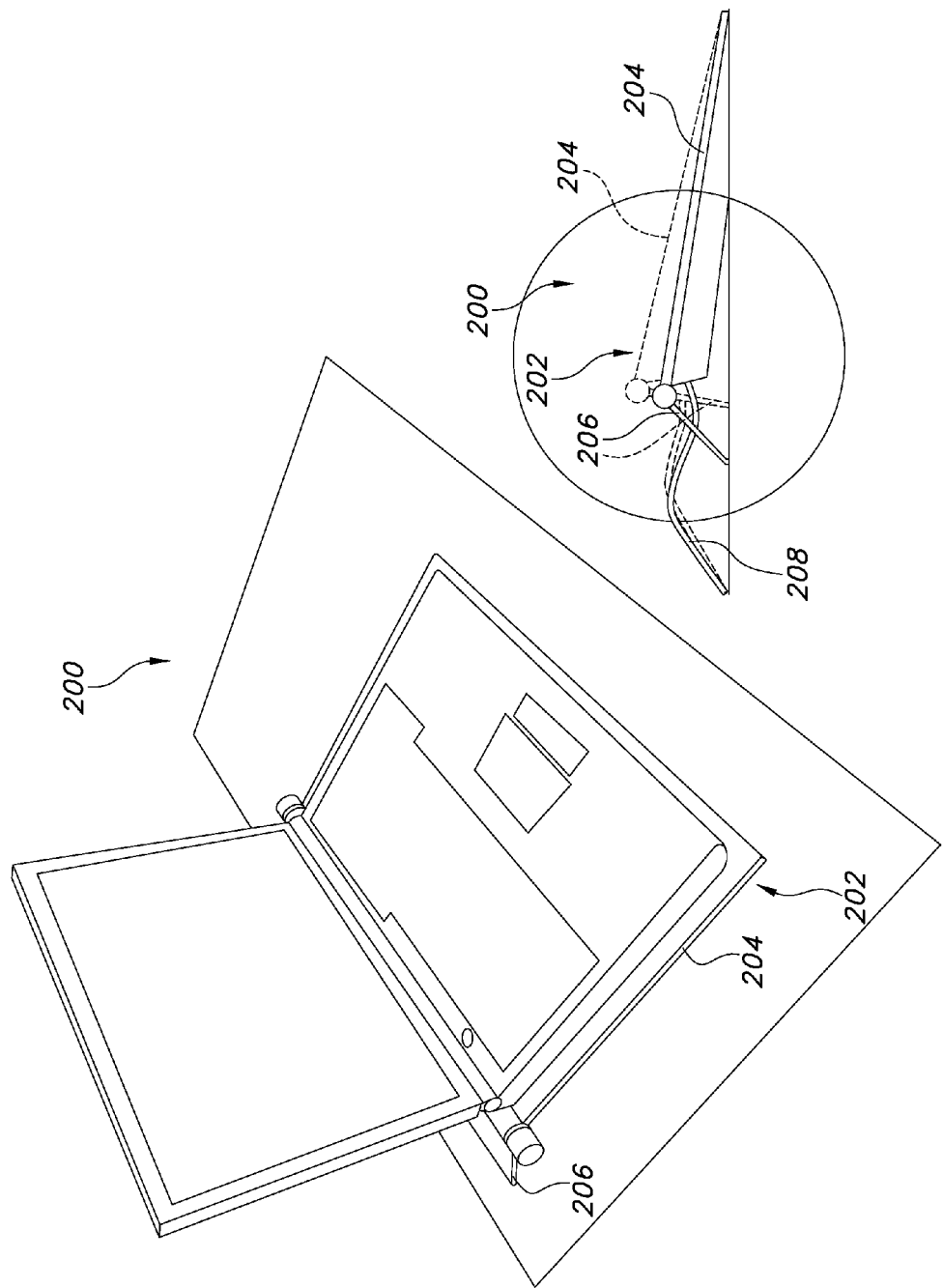
FIG. 17 is illustrations of an adjustable-height desktop pedestal.
Figure 18:
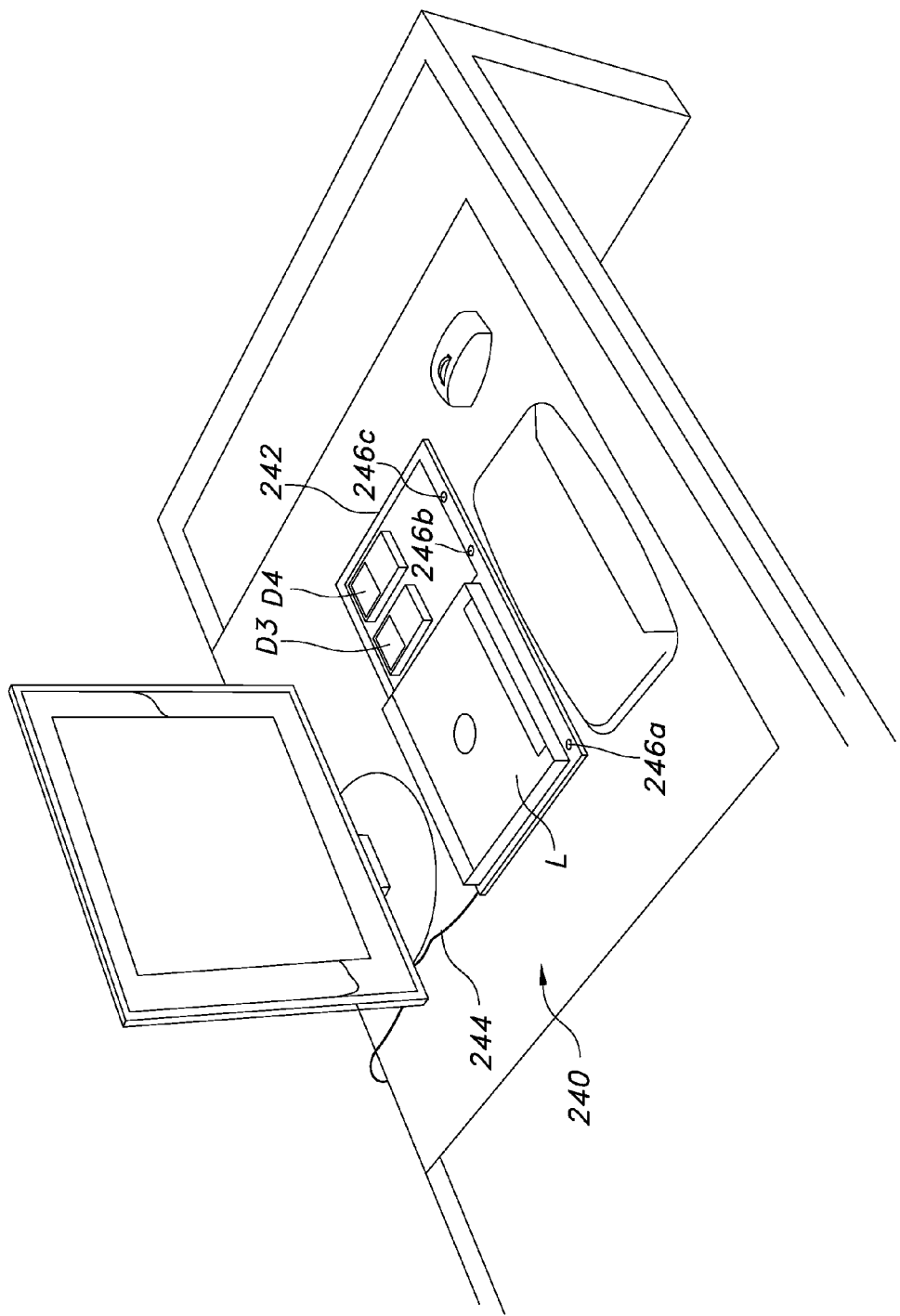
FIG. 18 is an illustration of a desktop panel.
Figure 19:
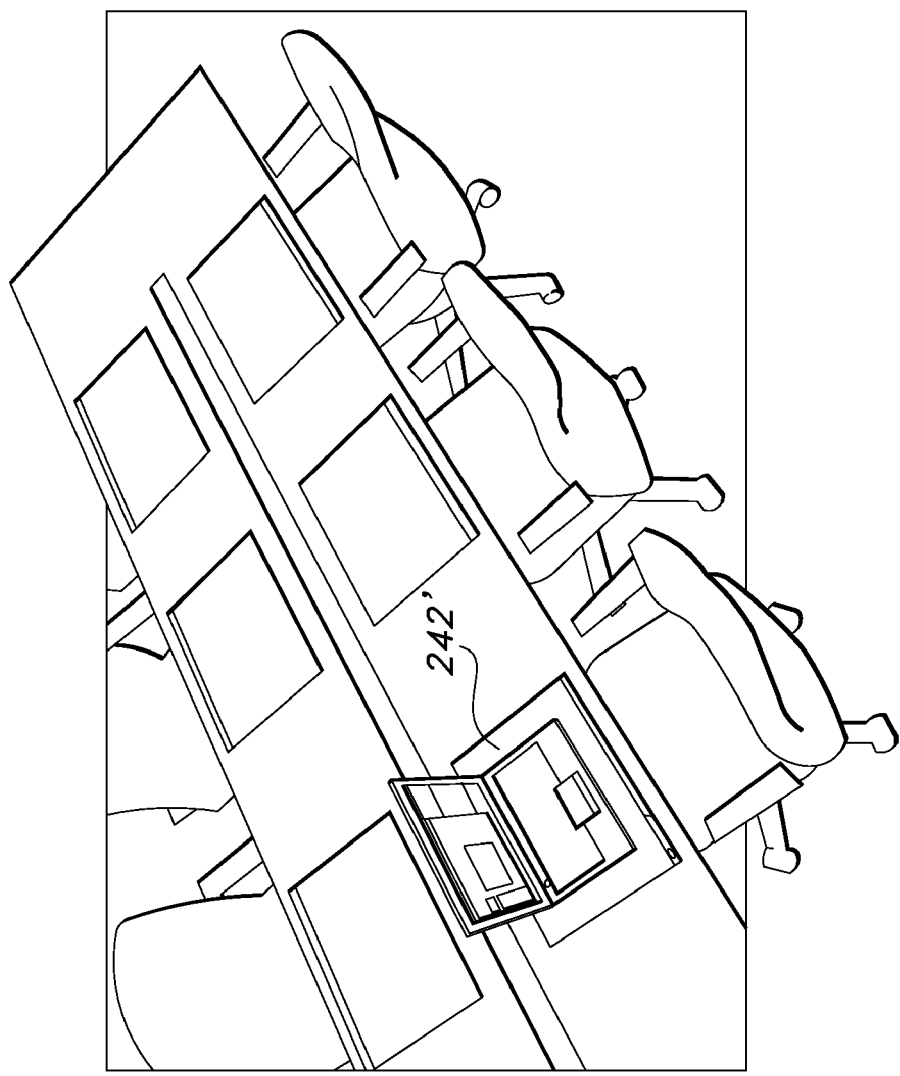
FIG. 19 is an illustration of a plurality of alternative desktop panels.

Referring now to FIG. 17, the power supply station 200 may be incorporated into a height adjustable laptop pedestal 202. The pedestal 202 may include a top 204 and a support leg 206. The top 204 may include a locator slot and may be sized to accommodate essentially any portable computers from UMPCs to multi-media laptops. One or more inductive primaries (not shown) may be mounted to or embedded within the top 204. The power supply circuitry (not shown) may be incorporated into the top 204. Alternatively, the power supply circuitry may be located in a power supply brick (not shown) located remotely from the pedestal 202. For example, a power supply brick may be located along cord 208 between the pedestal 202 and the wall plug (not shown). The size, shape and configuration of the pedestal may vary from application to application. For example, the size and shape of the pedestal may be varied to correspond with the shape of the laptop. As another example, the pedestal can be extended to also accommodate handheld devices.

As perhaps best shown in FIGS. 18-21, the power supply station 240 may alternatively be incorporated into a desktop panel 242. In one embodiment, the panel 242 may be removably placed on a desktop or may be integrated directed into the desktop. The desktop panel 242 may be sized to accommodate a laptop L (See 242', FIG. 19) or it may be large enough to accommodate a laptop L and a plurality of handheld devices D3 and D4 (See 242, FIG. 18). One or more primary coils (not shown) may be incorporated into the panel 242. The primary coil(s) (not shown) may be mounted to a surface of the panel or may be embedded within the panel 242. For example, the panel 242 may have a laminated construction and a plurality of primary coils may be mounted between the layers. The number, size, location and arrangement of primary coils will vary from application to application. As with essentially all other embodiments, locator features can be incorporated into the panel 242 to facilitate alignment between the primary coils in the panel 242 and the secondary coils in the electronic devices. For example, the panel 242 and electronic devices may include magnets (not shown) that draw the laptop L and devices D3 and D4 into proper alignment on the panel 242. Alternatively the panel 242 may be contoured or include graphics that show proper placement of the laptop L and/or devices D3 and D4. The power supply circuitry (not shown) may be located remotely from the panel 242, for example, in a brick located along cord 244 between the panel 242 and the wall plug (not shown). The panel 242 may include indicator lights 246a-c that provide a visual indication of the status of the system. The lights 246a-c may simply go "on" and "off" depending on whether or not the electronic device is inductively coupled with the power supply station 240. Alternatively, the lights 246a-c may become brighter or otherwise change as the quality of the coupling improves. For example, the light may switch from red to yellow to green as the electronic device moves into better alignment with the primary coil(s).

Figure 20:
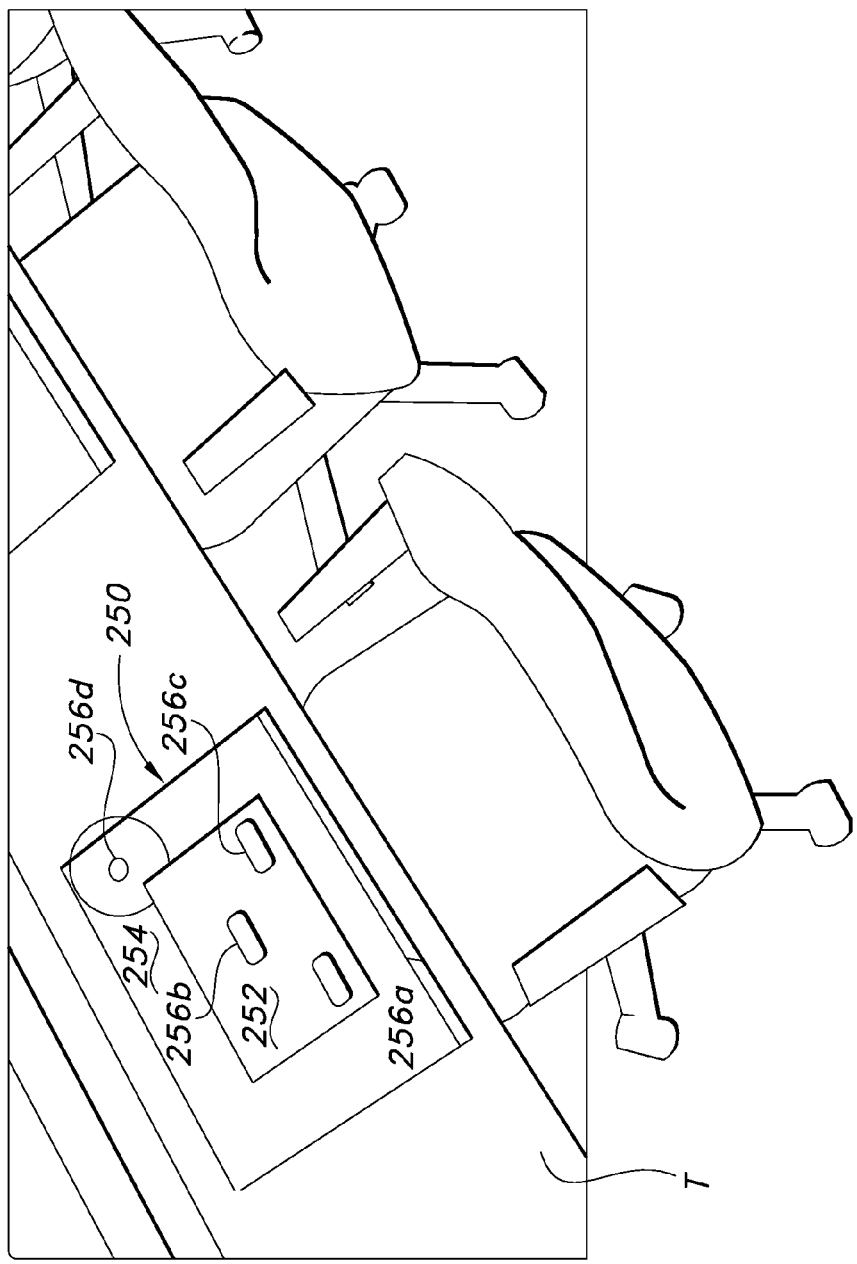
FIG. 20 is an illustration of a second alternative desktop panel.
Figure 21:
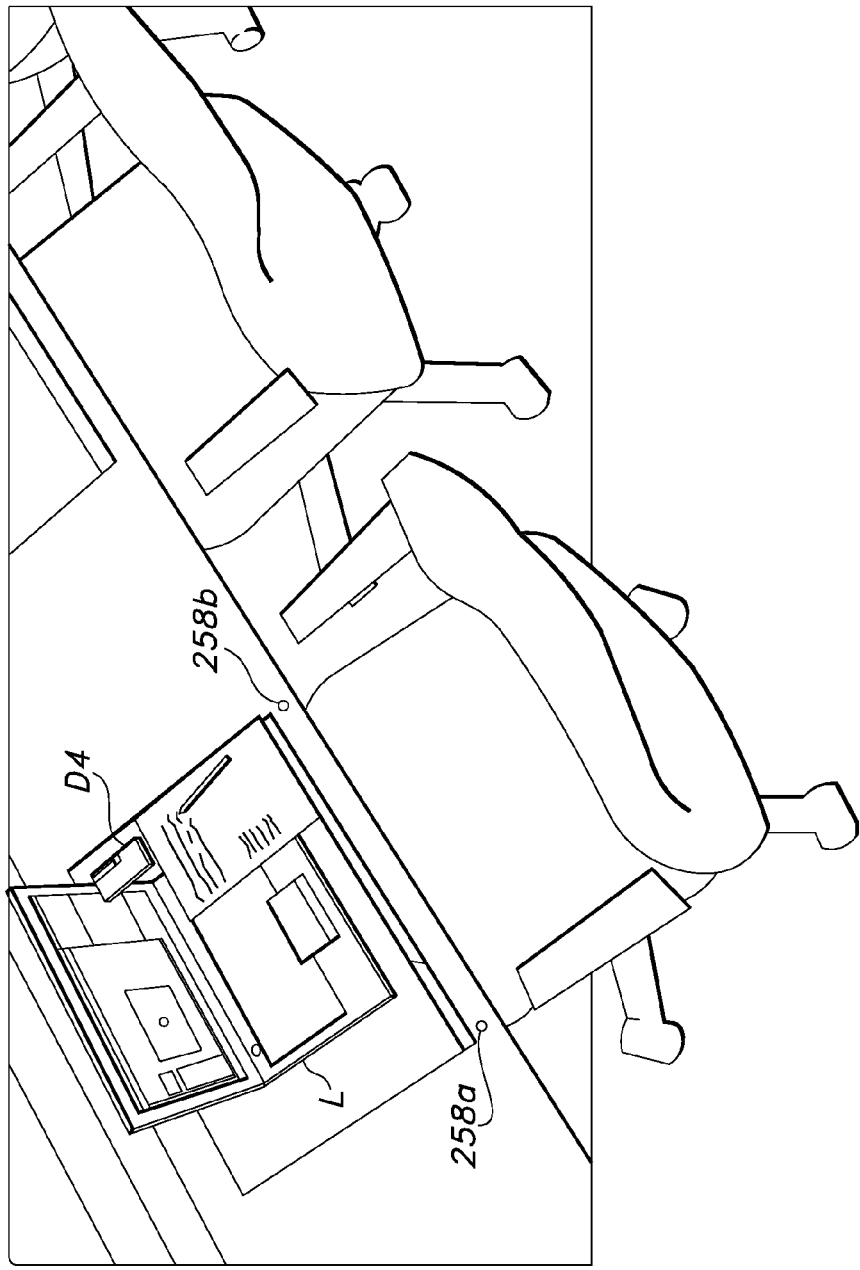
FIG. 21 is an illustration showing a laptop and handheld device on the alternative desktop panel of FIG. 20.

FIGS. 20 and 21 show another alternative panel embodiment. In this embodiment, the desktop panel 250 is large enough to accommodate a laptop L and one or more additional handheld devices D4. In the illustrated embodiment, the panel 250 is incorporated directly into the table top T, and is not readily removable (although it alternatively could be separate from the table top T or removable). The panel 250 may include a central laptop region 252 and a peripheral accessory region 254. The laptop region 252 may include a plurality of primary coils 256a-c that offer laptop placement options within the laptop region 252. Alternatively, the multiple coils can be provided to allow multi-phase inductive coupling. The peripheral region 254 may include one or more primary coils 256d that provide one or more wireless power regions for additional electronic devices, such as handheld device. Panel 250 may include an indicator light to provide a visual indication when the laptop and/or handheld device is properly coupled. In the illustrated embodiment, the panel 250 may include separate indicator lights 258a-b for the laptop and the handheld device, and the lights 258a-b are incorporated into the table top T. A plurality of panels 250 can be incorporated into a single table top T, if desired.

Figure 22:
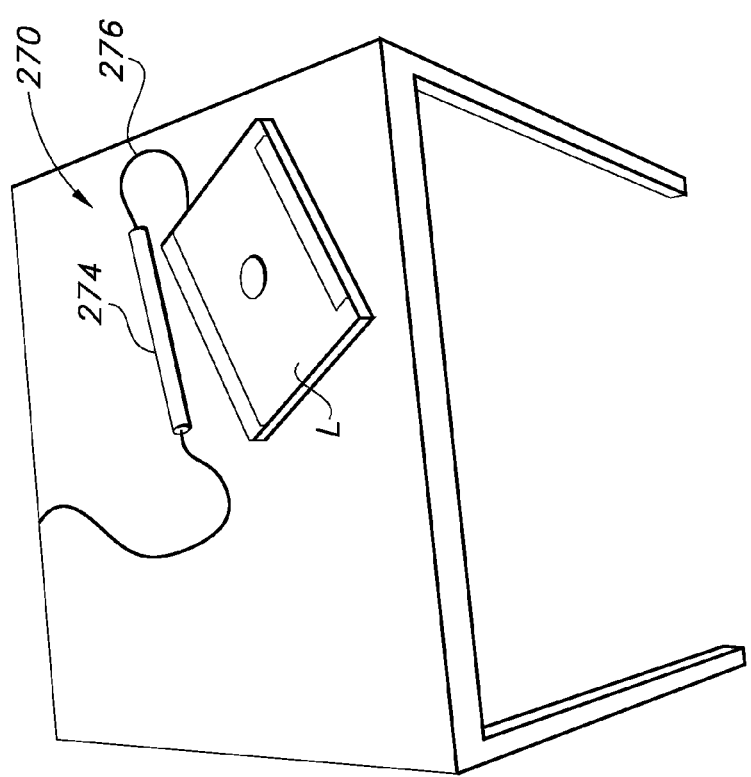
FIG. 22 is an illustration of a laptop situated on a flexible desktop mat.
Figure 23:
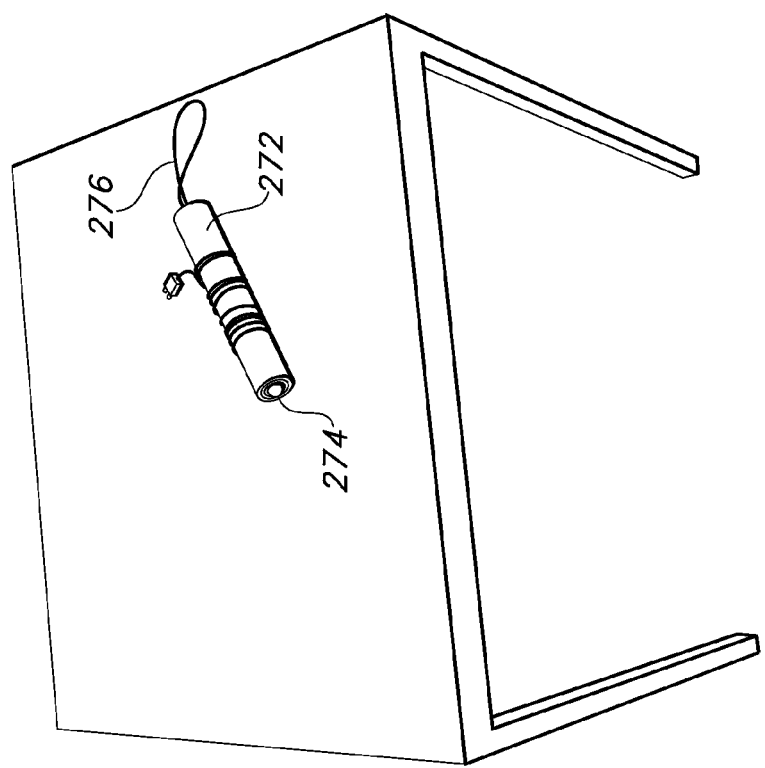
FIG. 23 is an illustration of the flexible desktop mat of FIG. 22 with the mat wrap around the power supply circuitry housing.

FIGS. 22 and 23 show another alternative embodiment in which the power supply station 270 is incorporated into a flexible power mat 272. In this embodiment, the power supply station 270 generally includes a flexible mat 272 (hidden below laptop L in FIG. 22) and a rigid power supply circuitry housing 274. The mat 272 may be coextensive with the laptop L (when unrolled) and may include one or more flexible primary coils (not shown) incorporated into or mounted upon a flexible substrate material. The size, shape and arrangement of primary coils may vary from application to application. The primary coil or coils may be printed on the flexible substrate material. The power supply circuitry (not shown) may be incorporated into the power supply circuitry housing 274. The power supply circuitry housing 274 may be located along the cord 276 between the mat 272 and a wall plug (not shown). As shown, the power supply circuitry housing 274 may have an aesthetically appealing cylindrical shape. In addition to providing attractive styling, the mat 272 may be rolled around the cylindrical housing 274 for storage.

Figure 24:
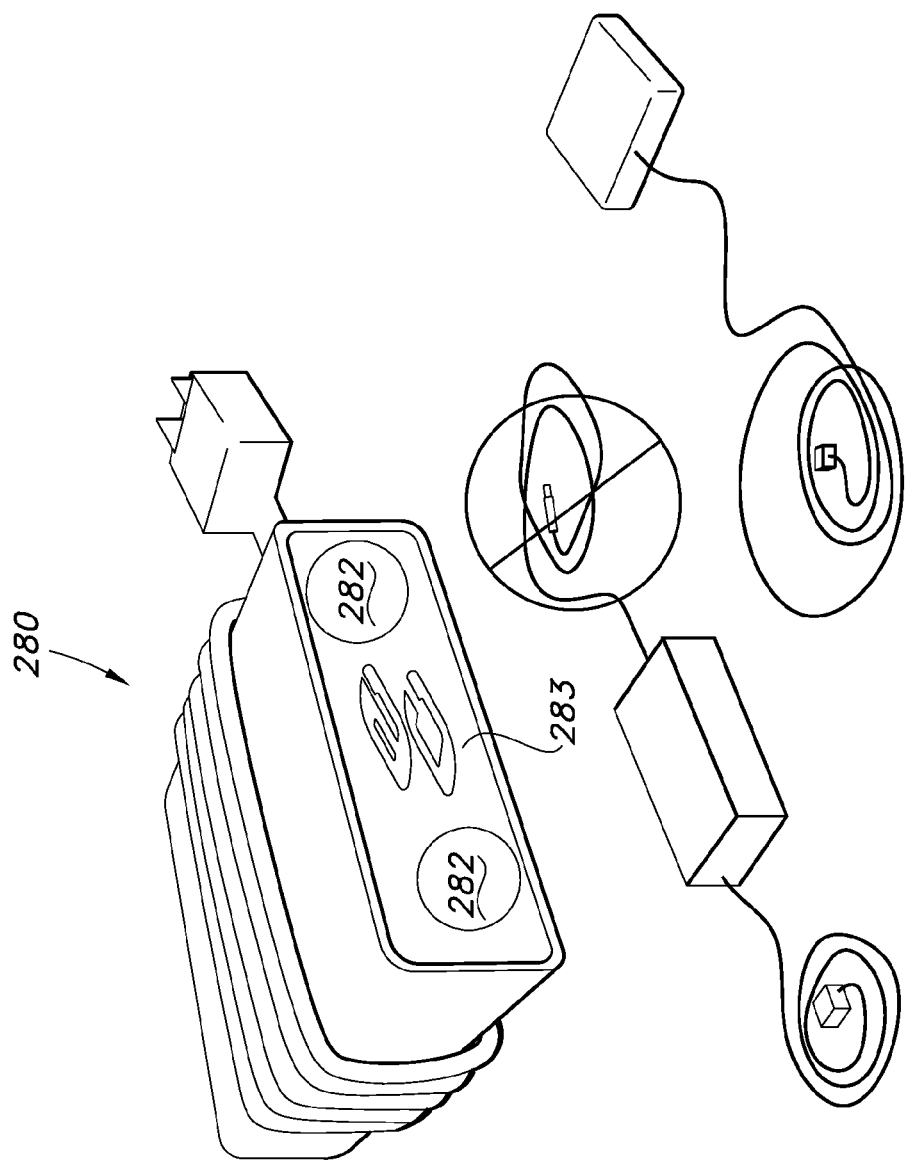
FIG. 24 are illustrations of a wireless power block and a prior art corded power block.
Figure 25:
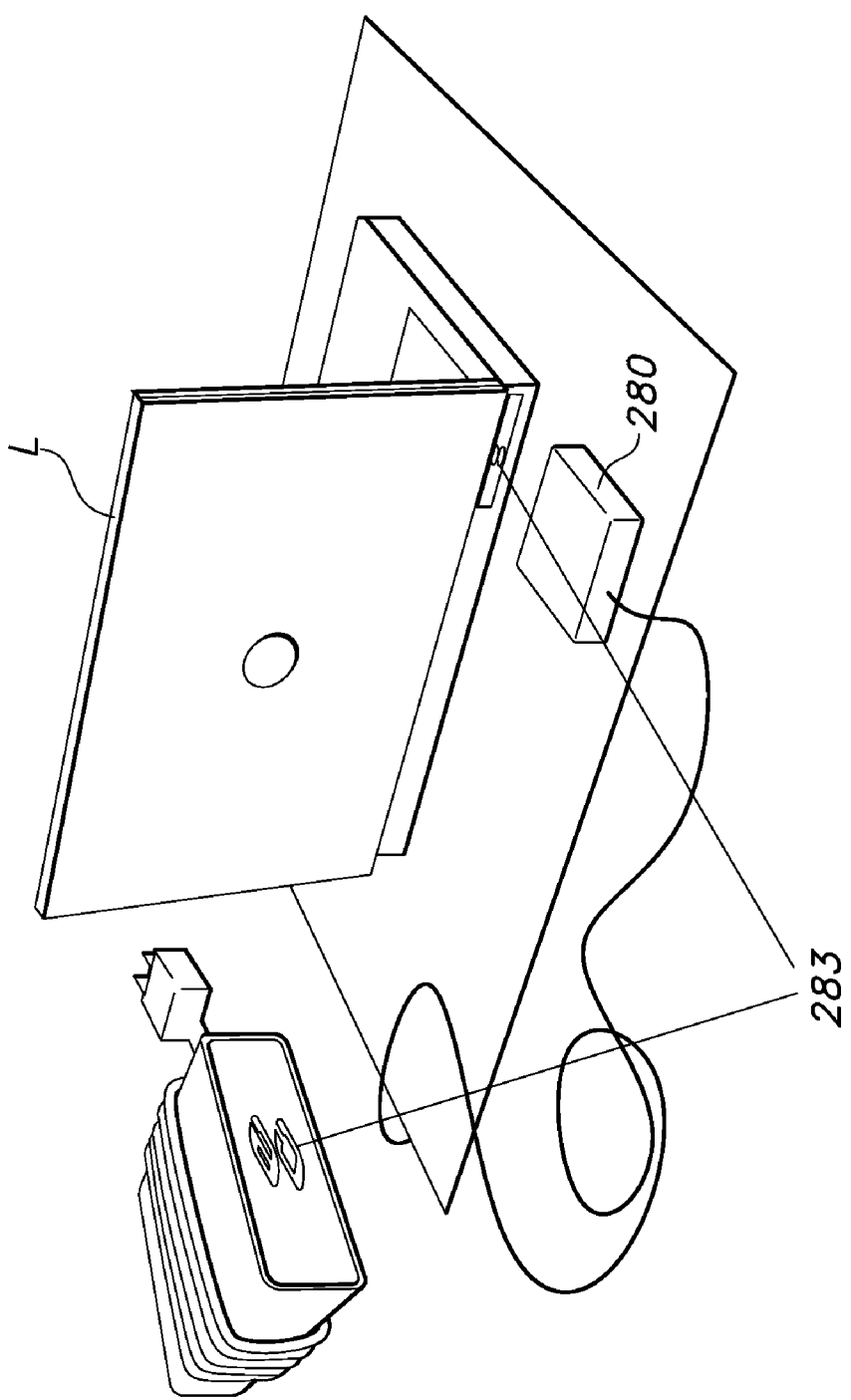
FIG. 25 is an illustration showing positioning of the power block adjacent to a laptop.
Figure 26:
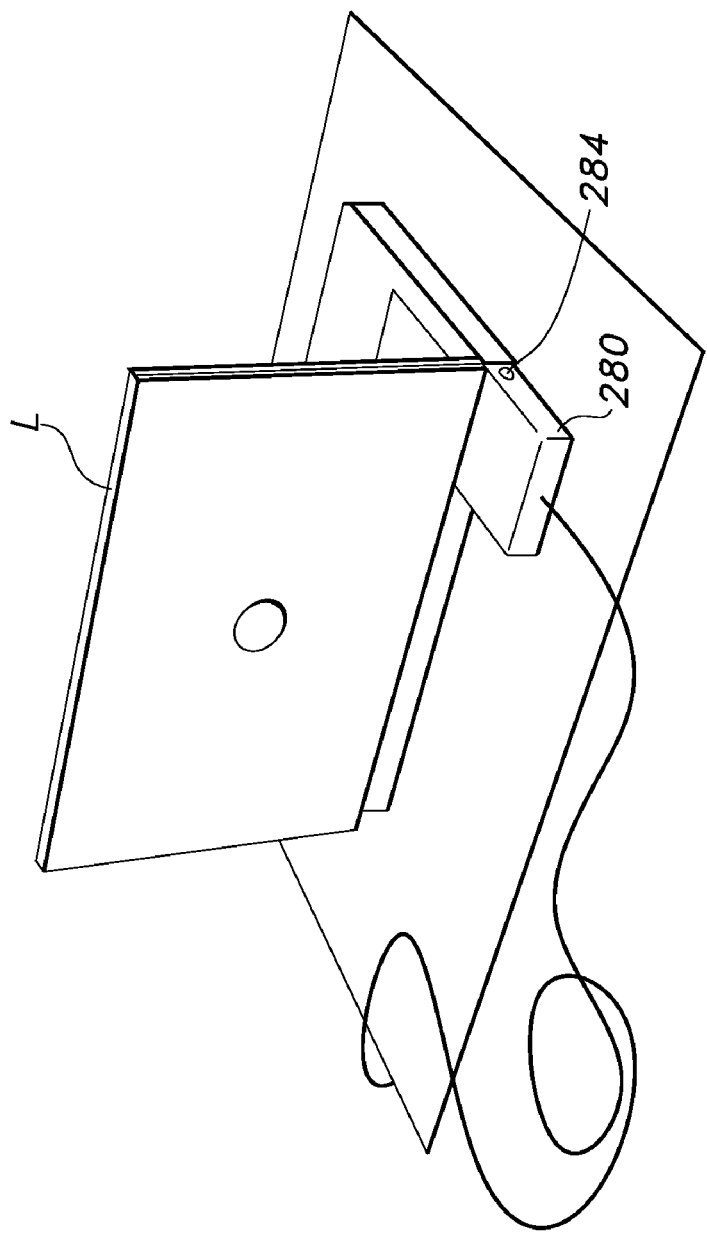
FIG. 26 is an illustration showing the power block positioned against the laptop.

Another alternative power supply station 280 is shown in FIGS. 24-26. In this embodiment, the power supply station 280 includes a single power block 280 that can be positioned adjacent to a laptop L or other electronic device to provide wireless power (See FIG. 24). In one embodiment, the power block 280 includes the power supply circuitry (not shown) and one or more primary coils (not shown). In use, the power block 280 may be positioned adjacent to a secondary coil (not shown) on the laptop or other electronic device to establish an inductive connection (See FIGS. 25 and 26). In the illustrated embodiment, the power block 280 and the laptop L include locating magnets 282 that draw the power block 280 into optimal alignment with the secondary coil (not shown). The laptop L and power block 280 may be printed with matching graphics 283 to help locate the proper position for the power block 280 (See FIG. 25). The power block 280 may include an indicator light 284 to provide visual indication when an acceptable inductive coupling has been established (See FIG. 26).

Figure 27:
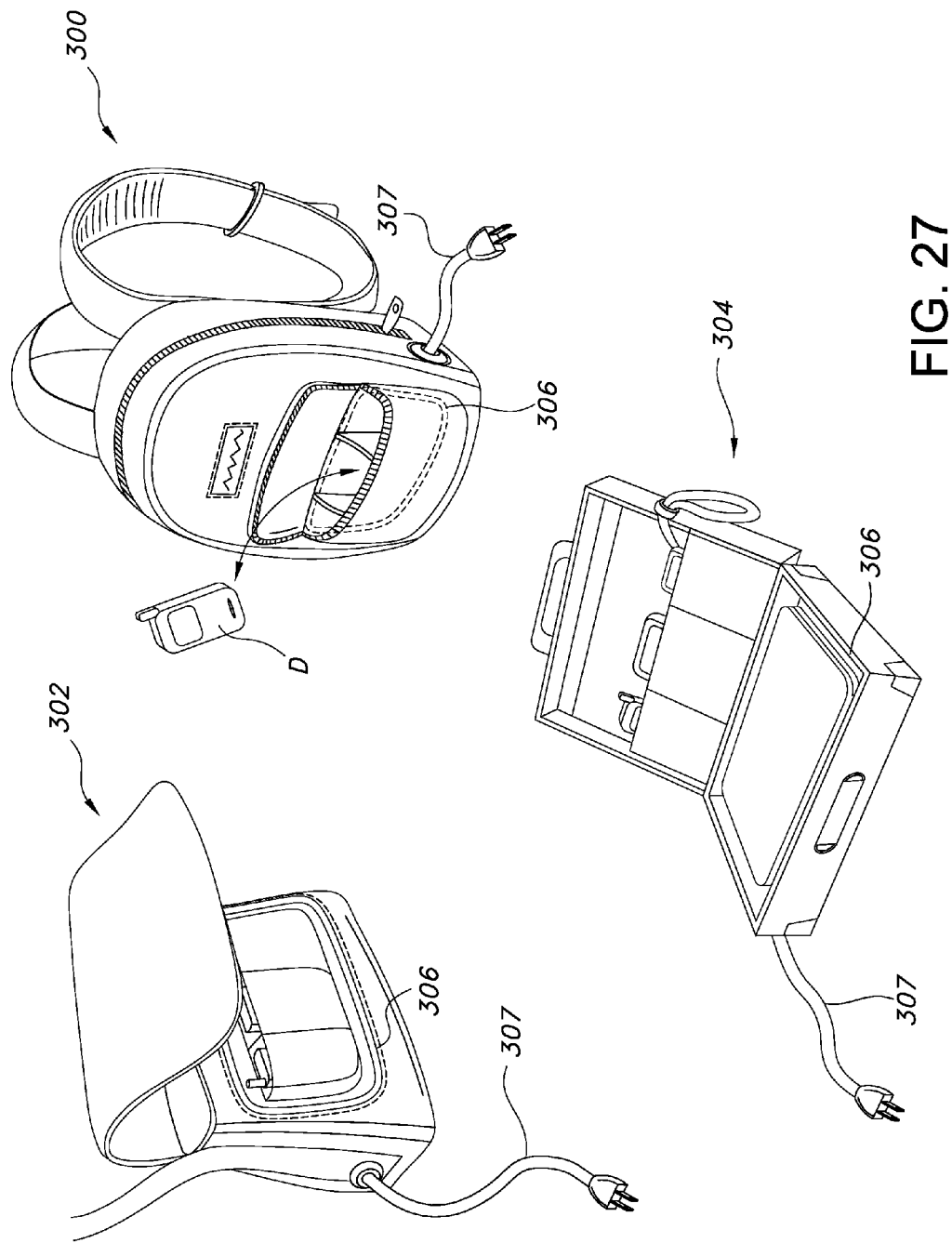
FIG. 27 is various illustrations of power supply stations incorporated into various types of luggage.
Figure 28:
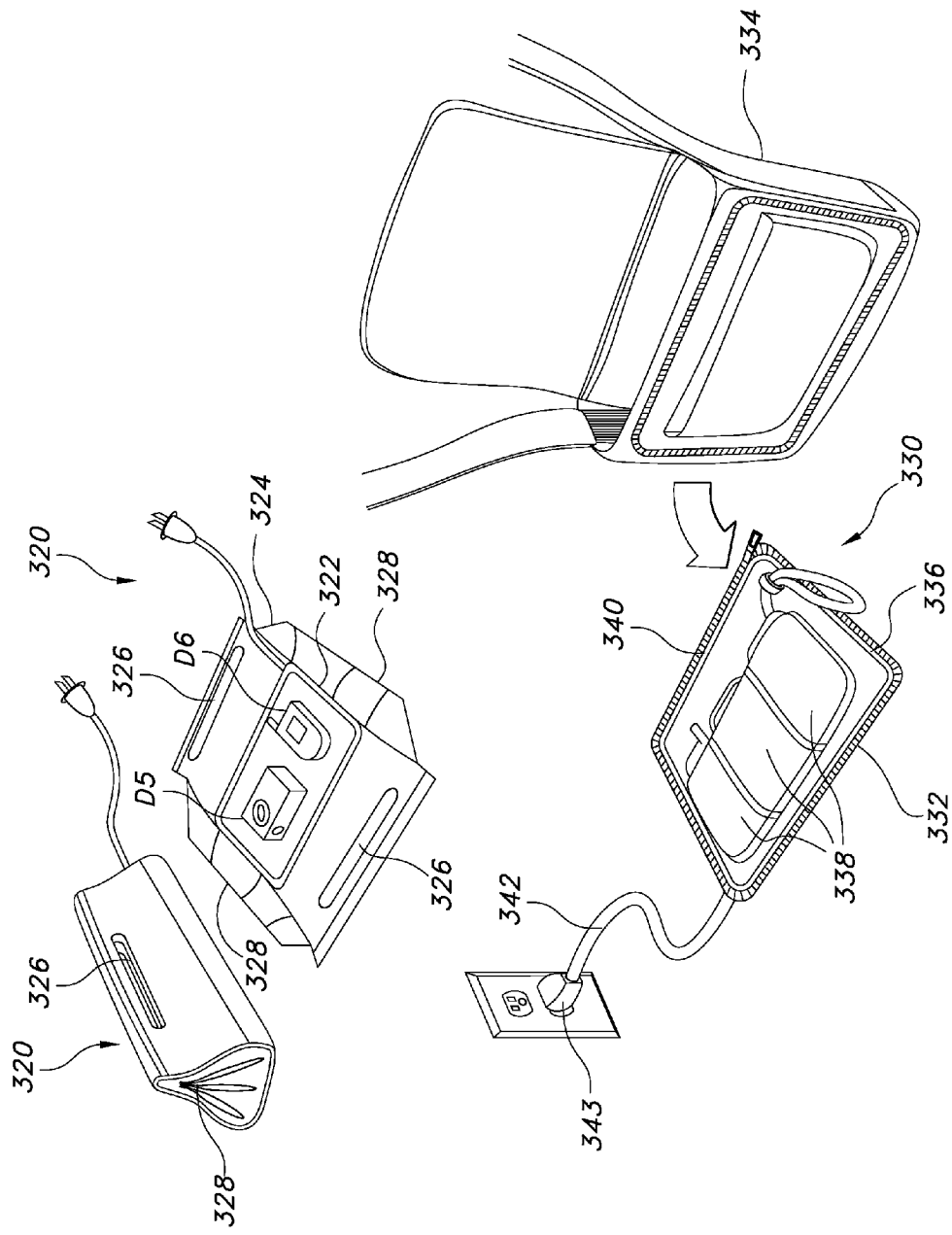
FIG. 28 is various illustrations of power supply stations incorporated into additional types of luggage.

The present invention may be incorporated into luggage, such as a backpack 300, a messenger bag 302 or a briefcase 304. Various alternative embodiments are shown in FIGS. 27 and 28. As shown, each item of luggage may include a primary coil 306 that is located adjacent to a pocket or a series of pockets or to a compartment suitable for storing one or more electronic devices. For example, the primary coil 306 can be sewn into the item of luggage. The power supply circuitry (not shown) is housed at any convenient location with the luggage. An electrical cord 307 is provided to connect the power supply station to standard wall power. The cord 307 may be retractable. For example, the cord 307 may be mounted on a conventional take-up reel.

In one embodiment, the power supply station 320 includes a primary coil 322 that is mounted to a flexible mat 324 (See FIG. 28). The flexible mat 324 is configured so that it can be folded to become a carrying case for the electronic devices D5 and D6. In this embodiment, the mat 324 may include integral handles 326 and side gathers 328 to draw the mat 324 into the desired shape.

In another embodiment, the power supply station 330 is incorporated into a removable carrying case panel 332 (See FIG. 28). In the illustrated embodiment, the panel 332 may be removable attached to the carrying case 334, for example, by a zipper 336. The panel 332 may include a plurality of pockets 338 and a primary coil 340. The power supply circuitry (not shown) may be disposed within a pocket on the removable panel 332 or it may be housed within a brick (not shown) located along the cord 342 between the panel 332 and the wall plug 343.

Figure 29:
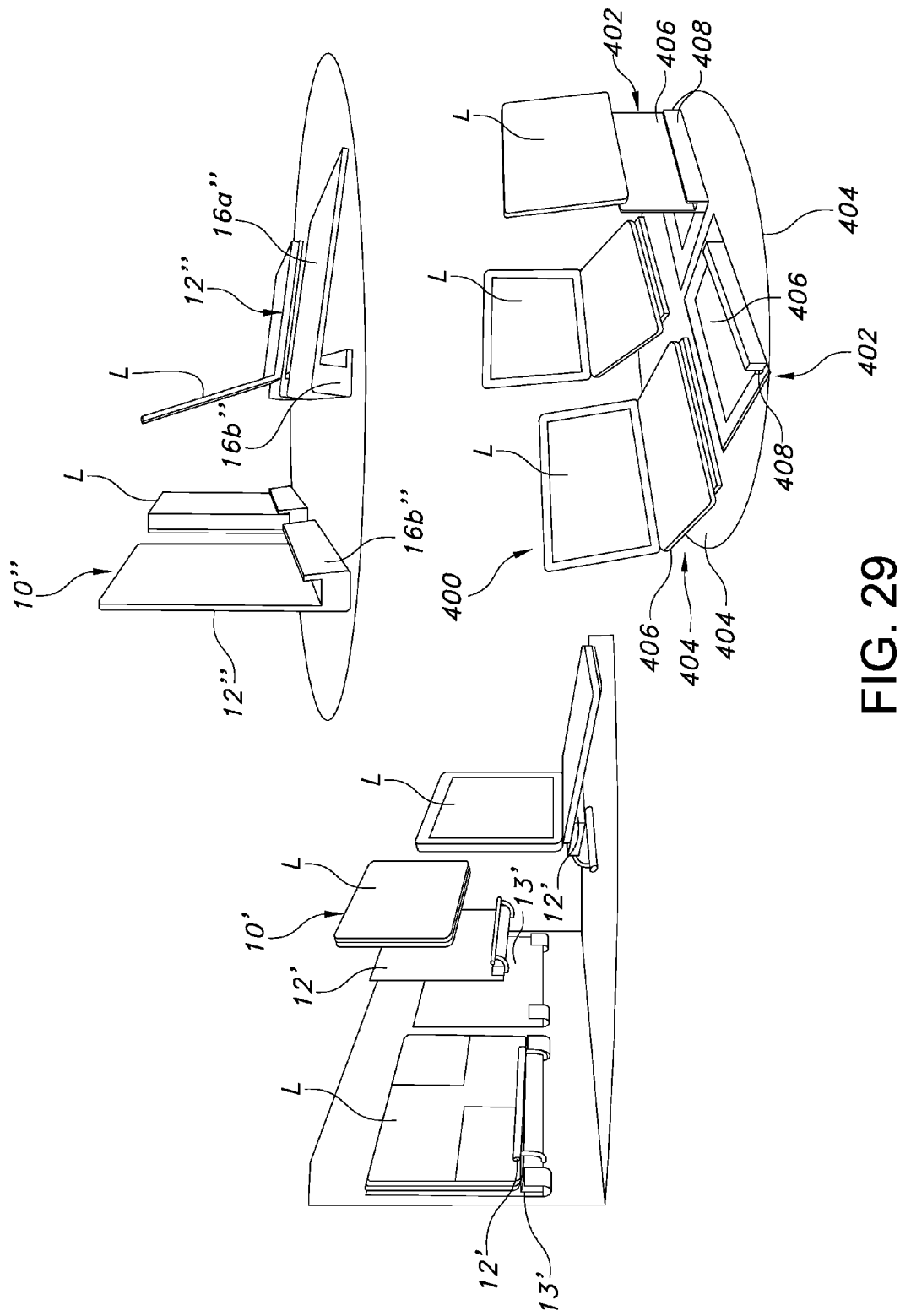
FIG. 29 is illustrations of various alternative power supply stations in accordance with the present invention.

A number of additional alternative embodiments are shown in FIG. 29. FIG. 29 shows an alternative power supply station 10' having a laptop cradle 12' intended for use in both upright and reclined positions. The power supply station 10' may include a wall bracket 13' for mounting the laptop cradle 12' to the wall in an upright position.

FIG. 29 also shows an alternative power supply station 400 having a desktop pedestal 402 with a base 404 and an adjustable support surface 406. The support surface 406 is coupled to the base 404 by a hinge 408. As shown, the support surface 406 may be raised or lowered to hold the laptop L in the desired position. One or more primary coils (not shown) may be mounted to or embedded within the support surface 406. The power supply circuitry (not shown) may be incorporated into the base 404 or into a brick (not shown) located along the power cord (not shown) for the power supply station 400.

Finally, FIG. 29 shows an alternative embodiment of power supply station 10" in which the shorter wall 16b" of the cradle 12" is angled to facilitate use in the reclined position. As can be seen, the angled wall 16b" is oriented to lie along a horizontal surface when the cradle 12" is place in the reclined position.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The invention claimed is:

1. A wireless power supply system for inductively transferring power to a removable remote device, comprising:
    an inductive power supply for generating an electromagnetic field;
    a cradle movable between a first position for supporting the remote device in a first orientation on a first power transfer surface and a second position for supporting the remote device in a second orientation on a second power transfer surface, each of said power transfer surfaces supporting said remote device within said electromagnetic field;
    a first primary disposed on or within said cradle, said primary being operatively coupled to said inductive power supply to generate said electromagnetic field, said primary positioned to inductively couple with the remote device when placed in either said first orientation or said second orientation;
    wherein said cradle is generally "J"-shaped and defines a channel of sufficient width to receive the remote device; and
    wherein said channel is of sufficient length to define a first region to receive a first remote device and a second region to receive a second remote device, said cradle including a first primary disposed adjacent to said first region to generate a first electromagnetic field to provide power to the first remote device and a second primary disposed adjacent to said second region to generate a second electromagnetic field to provide power to the second remote device.

2. The wireless power supply system of claim 1 wherein said channel corresponds in width with the remote device, whereby the remote device is closely received within said channel.

3. The wireless power supply system of claim 1 wherein the cradle includes an inductive power supply disposed within said channel.

4. The wireless power supply system of claim 1 wherein said cradle includes a first wall and a second wall spaced apart from the first wall, said first wall being substantially longer than said second wall, said primary being disposed in or on said first wall.

5. The wireless power supply system of claim 1 wherein said first power transfer surface supports the remote device in a substantially reclined position when said cradle is in said first orientation; and
    wherein said second power transfer surface supports the remote device in a substantially upright position when said cradle is in said second orientation.

6. The wireless power supply system of claim 5 wherein said cradle includes a movable leg, said leg being movable between an opened position to support said cradle in said upright position and a closed position in which said leg is out of the way when said cradle is in said reclined position.

7. A wireless power supply system for inductively transferring power to a removable remote device, comprising:
    an inductive power supply for generating an electromagnetic field;
    a cradle movable between a first position for supporting the remote device in a first orientation on a first power transfer surface and a second position for supporting the remote device in a second orientation on a second power transfer surface, each of said power transfer surfaces supporting said remote device within said electromagnetic field;
    a first primary disposed on or within said cradle, said primary being operatively coupled to said inductive power supply to generate said electromagnetic field, said primary positioned to inductively couple with the remote device when placed in either said first orientation or said second orientation; and
    wherein said system includes a plurality of cradles, each of said cradles including at least one primary for generating an electromagnetic field to transfer power to a remote device positioned in said cradle, at least one of said cradles receiving power from another of said cradles.

8. A wireless power supply system for inductively transferring power to a removable remote device, comprising:
    an inductive power supply for generating an electromagnetic field;
    a cradle movable between a first position for supporting the remote device in a first orientation on a first power transfer surface and a second position for supporting the remote device in a second orientation on a second power transfer surface, each of said power transfer surfaces supporting said remote device within said electromagnetic field;
    a first primary disposed on or within said cradle, said primary being operatively coupled to said inductive power supply to generate said electromagnetic field, said primary positioned to inductively couple with the remote device when placed in either said first orientation or said second orientation; and
    a second primary disposed on or within said cradle in a location different than said first primary, said second primary being operatively coupled to said inductive power supply to generate a second electromagnetic field, whereby said first primary and said second primary provide an ability for said system to supply power to more than one remote device and to permit flexibility in placement of the remote devices.

9. The wireless power supply system of claim 8 wherein said cradle is generally "J"-shaped.

10. The wireless power supply system of claim 9 wherein said cradle defines a channel of sufficient width to receive the remote device.

11. A wireless power supply system for inductively transferring power to one or more removable remote devices, comprising:
    an inductive power supply for generating a multiphase electromagnetic field;
    a cradle movable between a first position for supporting the remote device in a first orientation on a first power transfer surface and a second position for supporting the remote device in a second orientation on a second power transfer surface, each of said power transfer surfaces supporting the remote device within said multiphase electromagnetic field; and
    a plurality of primaries disposed on or within said cradle, each of said primaries being operatively coupled to said inductive power supply to generate one phase of said multiphase electromagnetic field, said primaries positioned to collectively generate said multiphase electromagnetic field to inductively couple with the remote device.

12. The wireless power supply system of claim 11 wherein said plurality of primaries are arranged symmetrically about an axis, whereby the remote device may inductively couple with the primaries in at least two distinct orientations.

13. A wireless power supply system for inductively transferring power to a remote device, comprising:
a rigid housing including an inductive power supply, said housing defining a cylindrical shape;
a primary for generating an electromagnetic field, said primary being electrically coupled to said inductive power supply; and
a power transfer mat upon which a remote device may be removably positioned, said power transfer mat including a flexible substrate, said primary disposed on or within said substrate and being flexible, whereby said power transfer mat may be rolled up and wrapped around said housing when not in use.

14. The wireless power supply system of claim 13 further comprising an electrical plug, said housing being separate from and electrically coupled to said plug wherein said rigid housing is electrically coupled between said electrical plug and said inductive primary.

15. Luggage for carrying and powering a remote device, comprising:
an item of luggage including a compartment shaped to receive the remote device, said item of luggage adapted to be opened into a flexible mat upon which the device can be placed;
an inductive power supply housed within said item of luggage, said inductive power supply including a power cord, said power cord being extendible from said item of luggage; and
a primary disposed within said item of luggage in a position adjacent to said compartment, said primary operatively coupled to said inductive power supply to generate an electromagnetic field in response to electrical power received from said inductive power supply.

16. The luggage of claim 15 wherein said power cord is further defined as a retractable cord.

17. The luggage of claim 15 further comprising a plurality of compartments, said primary extending along said plurality of compartments to generate an electromagnetic field of sufficient dimension to provide power to remote devices located in any of said plurality of compartments.

18. The luggage of claim 15 further comprising a plurality of compartments and a plurality of primaries, each of said primaries being uniquely paired with one of said compartments, each of said plurality of compartments generating an electromagnetic field to provide power to a remote device located within said paired compartment.

19. The luggage of claim 15 further comprising a plurality of integral handles to change configuration of the luggage from the flexible mat into the item of luggage.

* * * * *